US010429196B2

(12) United States Patent
Al-Hamad et al.

(10) Patent No.: US 10,429,196 B2
(45) Date of Patent: Oct. 1, 2019

(54) METHOD AND APPARATUS FOR CART NAVIGATION

(71) Applicant: InvenSense, Inc., San Jose, CA (US)

(72) Inventors: Amr Al-Hamad, Calgary (CA); Mostafa Elhoushi, Calgary (CA); Abdelrahman Ali, Calgary (CA); Jacques Georgy, Calgary (CA)

(73) Assignee: InvenSense, Inc., San Jose, CA (US)

( * ) Notice: Subject to any disclaimer, the term of this patent is extended or adjusted under 35 U.S.C. 154(b) by 19 days.

(21) Appl. No.: 15/686,999

(22) Filed: Aug. 25, 2017

(65) Prior Publication Data

US 2018/0259350 A1 Sep. 13, 2018

Related U.S. Application Data

(60) Provisional application No. 62/468,781, filed on Mar. 8, 2017.

(51) Int. Cl.
| | |
|---|---|
| *G01C 21/34* | (2006.01) |
| *G01C 21/28* | (2006.01) |
| *G01P 15/02* | (2013.01) |
| *G01C 21/12* | (2006.01) |
| *G01S 19/42* | (2010.01) |

(Continued)

(52) U.S. Cl.
CPC ......... *G01C 21/3423* (2013.01); *G01C 21/12* (2013.01); *G01C 21/16* (2013.01); *G01C 21/206* (2013.01); *G01C 21/28* (2013.01); *G01C 21/3415* (2013.01); *G01C 21/3484* (2013.01); *G01P 13/00* (2013.01); *G01P 15/02* (2013.01); *G01P 15/14* (2013.01); *G01S 5/0263* (2013.01); *G01S 19/42* (2013.01); *G06K 9/00697* (2013.01); *G01P 15/00* (2013.01)

(58) Field of Classification Search
CPC ...... G01C 21/12; G01C 21/16; G01C 21/206; G01C 21/28; G01C 21/3415; G01C 21/3423; G01C 21/3484; G01P 13/00; G01P 15/00; G01P 15/02; G01P 15/14; G01S 19/42; G06K 9/00335
USPC .......................................................... 701/466
See application file for complete search history.

(56) References Cited

U.S. PATENT DOCUMENTS

| | | | | |
|---|---|---|---|---|
| 9,091,551 | B2 * | 7/2015 | Hannah | A47F 10/04 |
| 2010/0259438 | A1 * | 10/2010 | Jones | G01C 15/00 342/22 |

(Continued)

*Primary Examiner* — Atul Trivedi
(74) *Attorney, Agent, or Firm* — Bay Area Technology Law Group PC

(57) ABSTRACT

An apparatus and method are disclosed for cart navigation using a portable device that is conveyed by the cart, but may be tethered or untethered and wherein mobility of the portable device may be constrained or unconstrained within the cart. The cart may be any apparatus propelled by on foot motion of a user. The portable device may have an integrated sensor assembly integrated with at least one sensor outputting data representing motion of the portable device. From the motion sensor data, it may be determined if the portable device is in a cart motion mode, if the cart is moving and an effective motion frequency for the portable device. Further, the motion sensor data may be reconstructed, a heading misalignment angle calculated and steps taken by the user detected. From this information, dead reckoning for the cart may be performed so that a navigation solution may be provided.

38 Claims, 25 Drawing Sheets

(51) Int. Cl.
*G01P 15/14* (2013.01)
*G01C 21/16* (2006.01)
*G01C 21/20* (2006.01)
*G01P 13/00* (2006.01)
*G06K 9/00* (2006.01)
*G01S 5/02* (2010.01)
*G01P 15/00* (2006.01)

(56) References Cited

U.S. PATENT DOCUMENTS

| | | | |
|---|---|---|---|
| 2011/0029277 A1* | 2/2011 | Chowdhary | G01C 21/165 702/150 |
| 2011/0035149 A1* | 2/2011 | McAndrew | G05D 1/0038 701/466 |
| 2012/0142443 A1* | 6/2012 | Savarese | A63B 71/06 473/199 |
| 2013/0311134 A1* | 11/2013 | Kordari | G01C 22/006 702/160 |
| 2014/0067313 A1* | 3/2014 | Breed | G06K 9/00771 702/141 |
| 2015/0122018 A1* | 5/2015 | Yuen | G01B 21/16 73/384 |
| 2015/0220906 A1* | 8/2015 | Jones | H04W 4/029 705/18 |
| 2016/0003933 A1* | 1/2016 | Calmettes | G01S 5/0072 342/357.25 |
| 2016/0116293 A1* | 4/2016 | Grover | G01C 21/34 701/23 |
| 2018/0120856 A1* | 5/2018 | Gabardos | G05D 1/0214 |
| 2018/0221236 A1* | 8/2018 | Girardini | A61H 3/00 |

* cited by examiner

METHOD AND APPARATUS FOR CART NAVIGATION

CROSS REFERENCE TO RELATED APPLICATIONS

This application claims priority from and benefit of U.S. Provisional Patent Application Ser. No. 62/468,781, filed Mar. 8, 2017, which is entitled "METHOD AND APPARATUS FOR CART NAVIGATION," which is assigned to the assignee hereof and is incorporated by reference in its entirety.

FIELD OF THE PRESENT DISCLOSURE

This disclosure generally relates to detecting whether a portable device is conveyed by a cart, but may be tethered or untethered and wherein mobility of the portable device may be constrained or unconstrained within the cart. The cart may be any apparatus propelled by on foot motion of a user.

BACKGROUND

Portable electronic devices, such as those configured to be handheld or otherwise associated with a user, are employed in a wide variety of applications and environments. The ubiquity of such devices as mobile phones, wearables, including smart watches and glasses, digital still cameras and video cameras, handheld music and media players, portable video game devices and controllers, tablets, mobile internet devices (MIDs), personal navigation devices (PNDs), other APPlication acCESSORIES (or Appcessories for short) and other similar devices speaks the popularity and desire for these types of devices. Increasingly, such devices are equipped with one or more sensors or other systems for determining the position or motion of the portable device with increasing sophistication and accuracy. Likewise, additional sensing capabilities are commonly available in the form of proximity and ambient light sensors, image sensors, barometers, magnetometers and the like. Still further, such portable devices often feature navigation systems, such as a Global Navigation Satellite Systems (GNSS), that enable precise determinations regarding geophysical position and movement. Corresponding advances in computation power, size, power consumption and prices make such portable devices powerful computing tools with extensive capabilities to detect their environment.

Given the noted popularity in portable devices having some or all of these capabilities, a wide variety of sensor data may be available and therefore leveraged to obtain useful information concerning activities in which the user may be engaged. One significant application relates to position or orientation determinations made in relation to given venue or location of the user. Generally, such applications may involve providing a navigation solution for the user of the portable device. A navigation solution may benefit the user by helping them find a desired location or to reconstruct a trajectory. However, a navigation solution may also be employed for other purposes, such as consumer analytics. As will be appreciated, the trajectory of a user through a retail venue may give a wide variety of useful information, including identifying items in which the user may be interested or evaluating characteristics of the retail experience that may be used to optimize store layout or shopping efficiency.

One technique for determining information regarding the positioning of an individual, whether in a moving vehicle or on foot, is commonly achieved using known reference-based systems, such as the Global Navigation Satellite Systems (GNSS). The GNSS comprises a group of satellites that transmit encoded signals to receivers on the ground that, by means of trilateration techniques, can calculate their position using the travel time of the satellites' signals and information about the satellites' current location. Such positioning techniques are also commonly utilized to position a device (such as for example, among others, a mobile phone) within or on the moving platform, whether such device is tethered or non-tethered to the moving platform. Currently, the most popular form of GNSS for obtaining absolute position measurements is the global positioning system (GPS), which is capable of providing accurate position and velocity information provided that there is sufficient satellite coverage. However, where the satellite signal becomes disrupted or blocked such as, for example, in urban settings, tunnels and other GNSS-degraded or GNSS-denied environments, a degradation or interruption or "gap" in the GPS positioning information can result.

In order to achieve more accurate, consistent and uninterrupted positioning information, alternative sources of positioning information may be self-contained and/or "non-reference based" systems within the device or the platform, and thus need not depend upon external sources of information that can become interrupted or blocked. One such "non-reference based" or relative positioning system is the inertial navigation system (INS), inertial sensors are self-contained sensors within the device or platform that use gyroscopes to measure rate of rotation/angle, and accelerometers to measure specific force (from which acceleration is obtained). Using initial estimates of position, velocity and orientation angles of the device or platform as a starting point, the INS readings can subsequently be integrated over time and used to determine the current position, velocity and orientation angles of the device and its relative misalignment within the platform. Typically, measurements are integrated once for gyroscopes to yield orientation angles and twice for accelerometers to yield position of the device or platform incorporating the orientation angles. Thus, the measurements of gyroscopes will undergo a triple integration operation during the process of yielding position.

A navigation solution based on dead reckoning from inertial sensors alone, however, may suffer because the required integration operations of data results in positioning solutions that drift with time, thereby leading to an unbounded accumulation of errors. Further problems in providing accurate position or navigation information about a portable device can arise where the device is capable of moving freely (e.g. without any constraints) or can move with some constraints within the moving platform. Inaccuracies can arise in such cases because the coordinate frame of the inertial sensors (accelerometers and gyroscopes) of the device is not aligned with the coordinate frame of the moving platform. The device and the moving platform can be misaligned with respect to one another, and such misalignment can change over time. For example, where the device moves freely without constraint, the misalignment of the device and the platform can change without constraint. Where the device is capable of constrained movement, the misalignment of the device and the platform can also change, wherein the change is subject to constraints. Where the portable device is mounted within the platform, there may still be a misalignment where such mounting results in a misalignment between the coordinate frame of the device and the coordinate frame of the platform (although such misalignment would not change over time). It should be noted that a skilled person would know and understand that the misalignment between a portable device and a moving platform does not equate or relate to misalignment that might occur where a navigation module for positioning a moving platform is positioned incorrectly within the moving platform, thereby resulting in a misalignment between the module and the moving platform.

To help compensate for these noted deficiencies of inertial sensors, dead reckoning strategies may attempt to characterize aspects of motion that may be due to the mode of motion being employed by the user. For example, pedestrian dead reckoning may involve estimating the number of steps taken and step length in order to supplement the information obtained from inertial sensors when developing a navigation solution. A similar example may occur when the user is pushing, pulling or otherwise propelling an apparatus through on foot motion, as opposed to a pedal-powered vehicle such as a bicycle or an independently-powered vehicle such as a car. Cart is defined as any apparatus that is propelled by on foot motion of a user, so it can be pushed or pulled by a user. The portable device is being conveyed by the cart. Some examples are given herein for demonstration. In one example, a user in a retail shopping venue may have a shopping cart or other similar wheeled vehicle that may be used to hold goods as they are selected for purchase. The user may elect to place the portable device within the cart, either loosely on a surface of the cart or in a holder that may or may not be adapted to that purpose. For example, it is common practice for a user to place their portable device within a cupholder or other similar structure. As discussed above, these usages lead to situations in which the portable device may or may not be constrained within the cart (i.e., the platform), with the resulting possibility that the relative orientation of the portable device with respect to the cart may not be known ahead of time or may change at any moment. As a further example, the portable device may be contained within another object, such as a purse, backpack, briefcase, bag or any other similar item, and the other containing object is then associated with the cart. When the containing object is simply placed within the cart, the conditions may be similar to those in which the portable device alone is place within the cart. However, the containing object may be hung from a handle or hook of the cart, allowing it to swing to varying degrees, which may impart an additional motion component that will be measured by the inertial sensors. In all those cases, the portable device is conveyed by the cart.

Although one example of a cart is a shopping cart, there are several other examples of carts. Among these other examples are child-carrying devices or strollers. One of ordinary skill in the art will appreciate that similar conditions may exist in applications involving other pedestrian-powered vehicles or on-foot user-powered vehicles or apparatus. Further, even though the vehicle typically may be wheeled, other types of vehicles, such as a sled that travels on skids or other sliding surfaces, may also have similar characteristics as long as the vehicle is propelled by on-foot motion of the user. For the purposes of this disclosure, any such pedestrian-propelled vehicle is a cart. More broadly, a portable device may be contained within or otherwise associated with a vehicle that is propelled, pushed or pulled, by the motion of a pedestrian, be it walking, running or other types of on foot motion. The techniques of this disclosure are directed to processing the sensor data from a portable device in such an application to provide a navigation solution.

SUMMARY

As will be described in detail below, this disclosure includes a method for cart navigation. The method may include obtaining motion sensor data from a portable device having a sensor assembly, wherein the portable device is conveyed by a cart and may be tethered or untethered, wherein mobility of the portable device may be constrained or unconstrained within the cart, and wherein the cart is an apparatus propelled by on foot motion of a user. It may then be determined that the portable device is in a cart motion mode and that the cart is moving. The method may then include determining an effective motion frequency for the portable device, reconstructing motion sensor data, calculating heading misalignment angle and detecting steps taken by the user. Dead reckoning for the cart may be performed based at least in part on the calculated heading misalignment angle and the detected steps and a navigation solution for the cart may be provided based at least in part on the dead reckoning.

This disclosure also includes a portable device for cart navigation. The portable device is conveyed by a cart and may be tethered or untethered, wherein mobility of the portable device may be constrained or unconstrained within the cart, and wherein the cart is an apparatus propelled by on foot motion of a user. The portable device may have an integrated sensor assembly including at least one sensor configured to output data representing motion of the portable device and a processor configured to obtain the motion sensor data. The portable device may also have a navigation module implemented with the processor configured to determine the portable device is in a cart motion mode, determine the cart is moving, determine an effective motion frequency for the portable device, reconstruct motion sensor data, calculate heading misalignment angle, detect steps taken by the user, perform dead reckoning for the cart based at least in part on the calculated heading misalignment angle and the detected steps and provide a navigation solution for the cart based at least in part on the dead reckoning.

DETAILED DESCRIPTION

Figure 1:
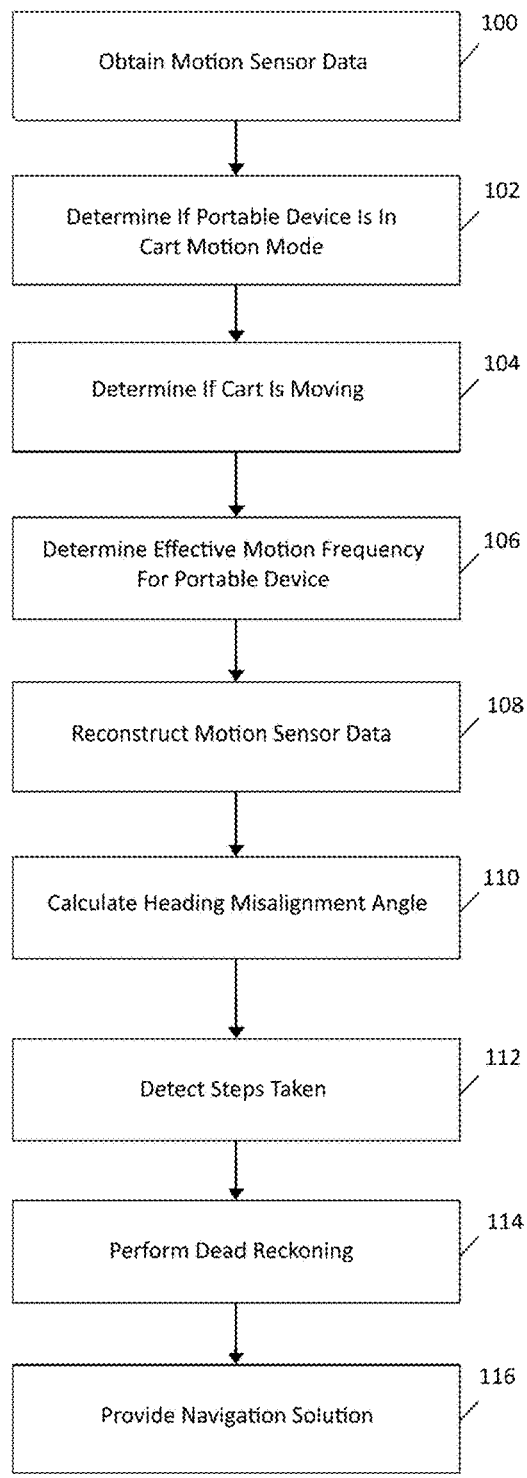
FIG. 1 is a block diagram for cart navigation with a portable device according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary portable devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As noted above, it is typical for a user to have a portable device associated with them due to their increasing popularity. Smartphones, wearables or other similar portable devices may have embedded technology for sensing the motion dynamics of the device, and may have other sensors that provide related information. For example, inertial sensors such as accelerometers and gyroscopes having multiple sensitive axes may be used to measure specific forces and angular rates, and consequently obtain changes in position and orientation. In some embodiments, inertial sensor data may be fused with data from other supplemental sensors such as magnetometers or barometers to improve position or orientation determinations. As used herein, the term "motion sensor data" refers to information from such inertial and non-inertial sensors that can be used to obtain changes in position, orientation or movement of the portable device, and by extension, any platform carrying the portable device by determining the relative orientation of the sensors in the device with respect to the platform. Such motion sensors give self-contained information, i.e. they do not depend on external source of information such as satellites or any other wireless transmission.

Thus, the sensor data of a portable device being conveyed by a cart that is propelled by a user reflects the movement of the platform, but may also experience movement that is independent of the platform. Cart is defined as any apparatus that is propelled by on foot motion of a user, so it can be pushed or pulled by a user. The portable device is being conveyed by the cart. As discussed above, when associated with a cart, the portable device may be tethered or untethered and mobility of the portable device may be constrained or unconstrained. Tethering typically indicates that the portable device is maintained in a fixed relationship to the platform. For example, the portable device may be placed in a cradle fixed to the cart. However, the techniques of this disclosure also apply when the portable device is not in a fixed relationship with the platform, such as when it is loose within the cart or when it is contained within another object that is associated with the cart. Thus, the mobility of the portable device may be constrained or unconstrained depending on the circumstances. Further, even when tethered or otherwise constrained, the relative orientation of the portable device may not be known. A portable device in a holder of the cart may be placed in a portrait, landscape or other orientation. Likewise, a portable device within a containing object may be up or down as well as facing inwards or outwards, while the containing object may also be placed within the cart in any orientation or may be hung from a handle or other structure of the cart. As will be described in the following materials, the techniques of this disclosure apply in all of these situations. Thus, the wide variety of sensor data collected by a portable device, including measurements such as acceleration, angular velocity, the surrounding local Earth's magnetic field, location, height and many others. As desired, all available sensor information may be employed or a specific group of sensors may be polled depending on the application.

As will be discussed below, the data of motion sensors (accelerometer, gyroscope, and/or others) may be used when providing a navigation solution, such as one employing dead reckoning techniques. In the above discussion, it was acknowledged that one problem of using these sensors is their poor performance over time which affects the accuracy and stability of the final solution. Noise and other disturbing movement sources, natural and human-made, are the sources of the unwanted signal which does not contain any useful information and affects the performance of these. Thus, noise may be an unwanted signal which is added to the original motion signal. In signal processing, there are two types of noise; white noise which is a random signal with a constant power spectral density and color noise which has various power spectral characteristics based on its type. Another source of unwanted signals affecting measurements of various motion sensors is a disturbance signal caused by the unintentional movement of the portable device (e.g. the lateral motion of the device). Aspects of this disclosure leverage the recognition that at least some portion of the noise in motion sensor data may be attributed to the mechanics of pedestrian motion. By identifying such components, it may be possible to adjust the sensor measurements to more accurately characterize the true motion of the cart and therefore to provide a more accurate navigation solution.

Pedestrian Dead Reckoning (PDR) is a known technique for estimating the position and attitude of a pedestrian who uses the portable or mobile device. PDR may be based on mainly on detecting the user steps to estimate the total travelled distance and estimating platform heading to set the user direction of motion. Estimating the total travelled distance of the user may also involve estimating the step length. When analyzing one step to another, the PDR algorithm may estimate the user step length and the direction of the user. As conventionally implemented, a PDR algorithm may include different modules responsible for performing different aspects, such as a module for step detection and step length estimation, another module for heading and motion of direction estimation, and another one for motion mode and activity recognition, etc. Dead-reckoning for cart navigation using portable device is a challenging problem as the sensor data may not have clear step patterns, given that the cart somewhat decouples the portable device from the pedestrian. Accordingly, conventional PDR may not be able to extract the necessary information from the sensor data. To cope with this, the techniques of this disclosure involve processing motion sensor data for a portable device that is associated with a cart in order to perform dead reckoning and, as such, may involve detecting steps and determining a misalignment angle between the portable device and the heading of the cart.

The navigation solution provided for the cart may then be used for any desired purpose. For example, the navigation solution may be used to track or locate the user propelling the cart. The user may then be guided to a particular destination, such as the location of an item for sale in a retail context. Further, navigation solutions from different users and/or different times may be used to analyze shopping behaviors. Based on the analysis, the retailers could retarget these customers with certain products to increase sales, optimize store layout, estimate demand or any of a wide variety of other purposes. Aggregated navigation solutions may also be used for crowdsourcing applications, such as generating fingerprinting maps based on any suitable technology, including WiFi, magnetic signals, cellular communication signals, Bluetooth, or other beacon-based systems.

The cart navigation techniques of this disclosure may be applied to any environment, including outdoor areas (whether open sky or urban/downtown) such as parking lots and sidewalks, and indoor areas, such as shopping malls, retail stores or underground parking lots. It should be appreciated these are merely examples and should not be considered limiting. While these techniques utilize self-contained information in the form of motion sensor measurements, they may be adapted for use in conjunction with absolute navigation information, such as GNSS or other reference-based system, when available.

To help illustrate the techniques of this disclosure, FIG. 1 depicts an exemplary routine for cart navigation using sensor data from a portable device. As discussed above, a cart is any apparatus or vehicle that is designed to be propelled by the on foot motion of a user, including by being pushed, pulled or some other interaction. For a pedestrian, this may involve walking, as well as jogging, running or other foot-based motion. Beginning with 100, sensor data may be obtained for a portable device. In one aspect, the sensor data may be inertial sensor data from one or more accelerometers, gyroscopes or other suitable motion and/or orientation detection sensors. In 102, the sensor data may be processed to determine whether the portable device is in a cart motion mode, that is, when the portable device is being conveyed by the cart. As noted, this may involve the portable device being associated with the cart by loosely resting on a surface within the cart. Further, the portable device may be held within a structure of the cart, such as cradle or holder. In such applications, the portable device may be constrained to varying degrees depending on whether the holder was designed for the specific device or is simply a more general structure be used for this purpose, such as a cup holder. Notably, even if the holder tightly retains the portable device, it's orientation within that holder may not be known, as it may be facing towards/away from the user or may be right side up/upside down for example. Still further, the portable device may be associated with the cart by being within another containing object that is itself within the cart or may be hanging from or otherwise secured to the cart. In 104, the sensor data may be used to determine if the cart is moving, such as by being propelled by on foot motion of the user. Next, an effective motion frequency for the portable device may be determined in 106, followed by reconstruction of the motion sensor data in 108 using the calculated effective motion frequency. Using the reconstructed motion sensor data, a heading misalignment angle may be calculated in 110 and steps taken by the user in 112. Accordingly, in 114 dead reckoning for the cart may be based at least in part on the calculated heading misalignment angle and the detected steps so that a navigation solution for the cart may be provided in 116. As desired, the navigation solution may be the position determined from dead reckoning or the position may be integrated into an inertial navigation system, such as by being used as an update in the update phase of a state estimation.

Figure 2:
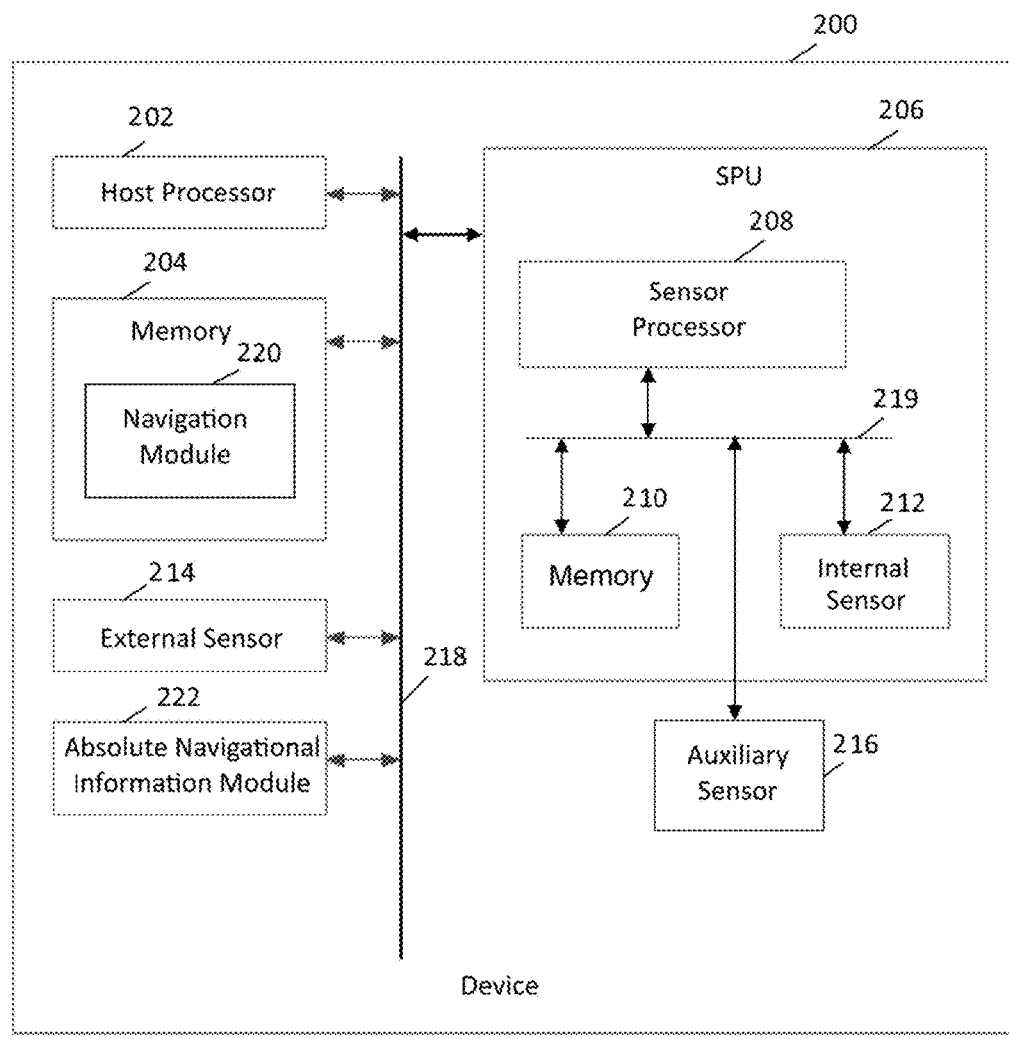
FIG. 2 is schematic diagram of a portable device for cart navigation according to an embodiment.

As noted above, the portable device may include a sensor assembly including inertial motion sensors providing measurements that may be used in characterizing the motion of a platform. To help illustrate these features, a representative portable device 200 is depicted in FIG. 2 with high level schematic blocks. As will be appreciated, device 200 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 200 includes a host processor 202, which may be one or more microprocessors, central processing units (CPUs), or other processors to run software programs, which may be stored in memory 204, associated with the functions of device 200. Multiple layers of software can be provided in memory 204, which may be any combination of computer readable medium such as electronic memory or other storage medium such as hard disk, optical disk, etc., for use with the host processor 202. For example, an operating system layer can be provided for device 200 to control and manage system resources in real time, enable functions of application software and other layers, and interface application programs with other software and functions of device 200. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 200, and in some of those embodiments, multiple applications can run simultaneously.

Device 200 includes at least one sensor assembly, as shown here in the form of integrated sensor processing unit (SPU) 206 featuring sensor processor 208, memory 210 and inertial sensor 212. As an example, SPU 206 may be a motion processing unit (MPU™, suitable implementations are available from InvenSense, Inc. of Sunnyvale, Calif.). Memory 210 may store algorithms, routines or other instructions for processing data output by inertial sensor 212 and/or other sensors as described below using logic or controllers of sensor processor 208, as well as storing raw data and/or motion data output by inertial sensor 212 or other sensors. Inertial sensor 212 may be one or more sensors for measuring motion of device 200 in space. Depending on the configuration, SPU 206 measures one or more axes of rotation and/or one or more axes of acceleration of the device. In one embodiment, inertial sensor 212 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 208, or other processing resources of device 200, combines data from inertial sensor 212 to provide a six axis determination of motion. As desired, inertial sensor 212 may be implemented using Micro Electro Mechanical System (MEMS) to be integrated with SPU 206 in a single package. Exemplary details regarding suitable configurations of host processor 202 and SPU 206 may be found in co-pending, commonly owned U.S. patent application Ser. No. 11/774,488, filed Jul. 6, 2007, and Ser. No. 12/106,921, filed Apr. 21, 2008, which are hereby incorporated by reference in their entirety.

Alternatively, or in addition, device 200 may implement a sensor assembly in the form of external sensor 214. External sensor 214 may represent one or more motion sensors as described above, such as an accelerometer and/or a gyroscope, that outputs data for categorizing, recognizing, classifying or otherwise determining device use case. As used herein, "external" means a sensor that is not integrated with SPU 206. In one aspect, external sensor 214 may represent one or more acoustic, infrared, ultrasonic, radio frequency, proximity and/or ambient light sensors. Also alternatively or in addition, SPU 206 may receive data from an auxiliary sensor 216 configured to measure one or more aspects about the environment surrounding device 200. For example, a barometer and/or a magnetometer may be used to refine position determinations made using inertial sensor 212. In one embodiment, auxiliary sensor 216 may include a magnetometer measuring along three orthogonal axes and output data to be fused with the gyroscope and accelerometer inertial sensor data to provide a nine axis determination of motion. In another embodiment, auxiliary sensor 216 may also include a barometer to provide an altitude determination that may be fused with the other sensor data to provide a ten axis determination of motion. Although described in the context of one or more sensors being MEMS based, the techniques of this disclosure may be applied to any sensor design or implementation. Either or both of external sensor 214 and auxiliary sensor 216 may be used as supplemental sensor data as desired, or other architectures may also be used to provide supplemental sensor data if warranted.

In the embodiment shown, host processor 202, memory 204, SPU 206 and other components of device 200 may be coupled through bus 218, while sensor processor 208, memory 210, internal sensor 212 and/or auxiliary sensor 216 may be coupled though bus 219, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 200, such as by using a dedicated bus between host processor 202 and memory 204.

In one aspect, the various operations of this disclosure may be implemented through navigation module 220 as a set of suitable instructions stored in memory 204 that may be read and executed by host processor 202. Other embodiments may feature any desired division of processing between host processor 202, SPU 206 and other resources provided by device 200, or may be implemented using any desired combination of software, hardware and firmware.

Multiple layers of software may be employed as desired and stored in any combination of memory 204, memory 210, or other suitable location. For example, a motion algorithm layer can provide motion algorithms that provide lower-level processing for raw sensor data provided from the motion sensors and other sensors. A sensor device driver layer may provide a software interface to the hardware sensors of device 200. Further, a suitable application program interface (API) may be provided to facilitate communication between host processor 202 and SPU 206, for example, to transmit desired sensor processing tasks. As such, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 202, sensor processor 208, a dedicated processor or any other processing resources of device 200.

As noted above, image sensor data may be used for aspects of this disclosure, including determining if platform of the portable device 200 is moving, identifying independent motion dynamics of the portable device and/or separating obtained motion sensor data into motion sensor data corresponding to motion of the platform and motion sensor data corresponding to the identified independent motion of the portable device. As opposed to sensor-based information, such as information that may be obtained from the self-contained sensors represented by inertial sensor 212, external sensor 214 and/or auxiliary sensor 216 discussed above, device 200 may also include absolute navigational information module 222 that provides any desired degree of location awareness capabilities. In one aspect, this may include a reference-based wireless system providing a source of absolute location information for device 200. Representative technologies that may be embodied by absolute navigational information module 222 include: (i) global navigation satellite system (GNSS) receiver such as global positioning system (GPS), GLONASS, Galileo and Beidou, or any other GNSS, as well as (ii) WiFi™ positioning, (iii) cellular tower positioning, (iv) Bluetooth-based positioning; (v) Bluetooth low energy (BLE)-based positioning; (vi) other wireless-based positioning; and (vii) visual light communication-based positioning or other similar methods.

Thus, the techniques of this disclosure may be used to provide a navigation solution for a cart based on sensor information from a portable device being conveyed by the cart. In one aspect, determining the portable device is in a cart motion mode may include processing motion sensor data from the portable device. Processing the motion sensor data may include applying a statistical analysis technique. The statistical analysis technique may be at least one of: (i) a frequency-domain analysis; and (ii) a time-domain analysis. Alternatively or in addition, processing the motion sensor data may include applying a machine learning technique. As such, features extracted from the processed motion sensor data may be input to at least one stored classification model to determine the portable device is in a cart motion mode. The at least one stored classification model may be developed during a training phase.

In one aspect, determining the cart is moving may include processing motion sensor data from the portable device by applying a statistical analysis technique. The statistical analysis technique may include evaluating at least one of: (i) peaks in accelerometer data; (ii) magnitude of rotation rate data; and (iii) magnitude of radius of rotation.

In one aspect, determining an effective motion frequency for the portable device may include processing the motion sensor data by performing a frequency domain analysis. The frequency domain analysis may be a Fast Fourier Transform (FFT).

In one aspect, reconstructing motion sensor data may be based at least in part on the determined effective motion frequency. Further, a maximum amplitude frequency component may be determined which corresponds to the effective motion frequency. Coefficients at the maximum amplitude frequency component may be determined and applied to reconstruct the motion sensor data.

In one aspect, calculating the heading misalignment angle may be based at least in part on processing the motion sensor data from the portable device. Processing the motion sensor data may include using a maximum variance technique. For example, processing the motion sensor data may include determining a slope of an axis having maximum variance. Processing the motion sensor data may include using Principal Component Analysis (PCA). Processing the motion sensor data may include determining an axis representing a minimum sum of squared distances. The axis representing a minimum sum of squared distances may be determined using a binary search and/or using an analytical technique.

In one aspect, the motion sensor data may be processed to resolve an ambiguity in the calculated heading misalignment angle. Resolving the calculated heading misalignment angle ambiguity may include performing a statistical analysis of at least one of: (i) roll and pitch angle averages; and (ii) average and range of vertical gyroscope data.

In one aspect, detecting steps taken by the user may include estimating a time interval between steps based at least in part on the determined effective motion frequency. A step taken may be registered by comparing a time associated with a previously detected step to the estimated time interval.

In one aspect, performing dead reckoning for the cart may include processing the motion sensor data to determine a heading of the portable device. Performing dead reckoning for the cart may include estimating cart heading based at least in part on the calculated heading misalignment angle and the determined heading of the portable device.

In one aspect, providing a navigation solution for the cart may include a position of the cart determined at least in part by the dead reckoning. Alternatively or in addition, providing a navigation solution for the cart may include using the determined position of the cart as an update in the update phase of a state estimation technique. Providing a navigation solution for the cart may also include integrating a source of absolute navigational information. The source of absolute navigational information may be at least one of: (i) a global navigation satellite system (GNSS); (ii) cell-based positioning; (iii) WiFi-based positioning; (iv) Bluetooth-based positioning; (iv) other wireless-based positioning; (v) magnetic fingerprint positioning; or (vi) visual light communication (VLC)-based positioning. The source of absolute navigational information may also be an anchor point.

As discussed above, the techniques of this disclosure also involve a portable device for cart navigation. In one aspect, the portable device may have a sensor assembly integrated with the portable device, including at least one sensor configured to output data representing motion of the portable device. A processor of the portable device may obtain the motion sensor data and implement a navigation module to determine the portable device is in a cart motion mode, to determine the cart is moving, to determine an effective motion frequency for the portable device, to reconstruct motion sensor data, to calculate heading misalignment angle, to detect steps taken by the user, to perform dead reckoning for the cart based at least in part on the calculated heading misalignment angle and the detected steps and to provide a navigation solution for the cart based at least in part on the dead reckoning.

In one aspect, the portable device may have a source of absolute navigational information, such that the processor may obtain the absolute navigational information and the navigation module may integrate the absolute navigational information when providing the navigation solution for the cart. The source of absolute navigational information may be at least one of the following: (i) a global navigation satellite system (GNSS); (ii) cell-based positioning; (iii) WiFi-based positioning; (iv) Bluetooth-based positioning; (v) Bluetooth low energy-based positioning; (vi) other wireless-based positioning; and (vii) visual light communication-based positioning.

In one aspect, the sensor assembly may be an inertial sensor. For example, the sensor assembly may include an accelerometer and a gyroscope. The inertial sensor may be implemented as a Micro Electro Mechanical System (MEMS).

EXAMPLES

As described above, the techniques of this disclosure may be used for providing a navigation solution for a cart, wherein a cart is any apparatus that is propelled by on-foot motion of a human user. Motion sensor data from a portable device having a sensor assembly may be obtained. When the portable device is being conveyed by a cart, the portable device may be tethered or untethered, such that mobility of the portable device may be constrained or unconstrained within the cart. It may be determined whether the portable device is in a cart motion mode and whether that the cart is moving. Using a determined effective motion frequency for the portable device, motion sensor data may be reconstructed, heading misalignment angle calculated and steps taken by the user detected. Dead reckoning for the cart may be performed based at least in part on the calculated heading misalignment angle and the detected steps and a navigation solution for the cart may be provided based at least in part on the dead reckoning.

Figure 3:
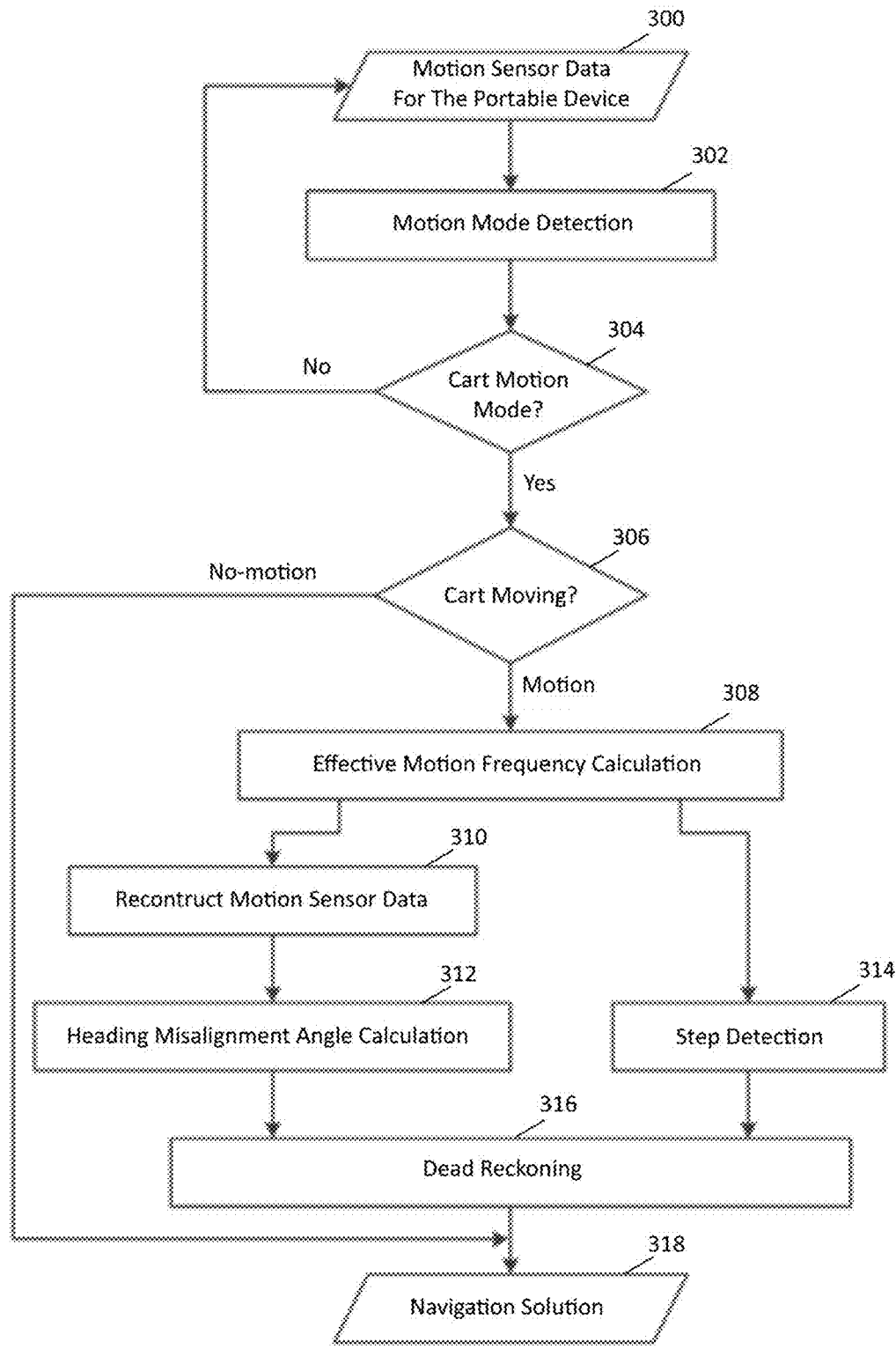
FIG. 3 is a flowchart showing a routine for cart navigation according to an embodiment.

To help illustrate aspects of this disclosure with regard to cart navigation, FIG. 3 depicts an exemplary routine for using sensor data from a portable device. Beginning with 300, sensor data may be obtained for a portable device. For example, the sensor data may be inertial or other motion sensor data, and may also include supplemental sensor data if desired. In 302, the sensor data may be processed to determine the motion mode for the portable device. As will be appreciated, a portable device may be employed in a number of motion modes, such as being carried by a walking pedestrian (i.e., a pedestrian motion mode), being contained within a motorized vehicle (i.e., driving motion mode), and others. Aspects of this disclosure relate to a cart motion mode, which as discussed above, occurs when the portable device is associated with and being conveyed by a cart. To reiterate, a number of possible associations between the portable device and the cart a possible, including: i) the portable device resting loosely on a surface of the cart; ii) the portable device being constrained to varying degrees by being retained within a structure of the cart (e.g., a cup holder); iii) the portable device being contained within another object, such as a bag, purse, briefcase, backpack, or other similar article, which in turn is resting on a surface of the cart; and iv) the portable device being within a containing object that is secured to the cart in some manner, such as by hanging from a handle or the like. Notably, the portable device will experience the motion of the cart when in cart motion mode, which indirectly relates to motion of the user, given that the cart is propelled by on foot motion of the user. This is to be distinguished from other scenarios in which the user may be pushing a cart but is directly associated with the portable device, such as by holding it or by securing to their person.

A branch occurs in 304, so that if a mode other than cart motion mode was detected in 302, the routine returns to 300 to continue obtaining motion sensor data to allow reevaluation of the motion mode should circumstances change. Otherwise, the routine progresses to 306, where another branch is made depending on whether the cart is moving. If the cart is not moving, the routine skips to 318 so that a navigation solution may be provided as the location of the cart does not change in case of no-motion. If the cart is moving, an effective motion frequency for the portable device is calculated in 308. As will be discussed below, the effective motion frequency corresponds to periodic motion components that may be attributed to the on foot motion of the user that is propelling the cart. Using the effective motion frequency, the motion sensor data, such as accelerometer data, may be reconstructed in 310 so that a heading misalignment angle between the portable device and the cart may be calculated in 312. In parallel, steps taken by the user when propelling the cart may be detected in 314. As indicated, dead reckoning may be performed in 316 using the calculated heading misalignment angle and the detected steps, as well as any other suitable information. Based on the dead reckoning, a navigation solution for the cart, and by extension, the user, may be output in 318. Depending on the embodiment, the navigation solution may be the position determined from dead reckoning or the position may be integrated into an inertial navigation system, such as by being used as an update in the update phase of a state estimation. Exemplary implementations of the above operations are discussed in the following materials.

As indicated, the techniques of this disclosure may be applied when the portable device is associated with and is being conveyed by a cart, a condition termed cart motion mode. Any suitable strategy may be employed to distinguish among potential motion modes, including a statistical analysis or machine learning based approach. In particular, a cart motion mode may be recognized as being distinct from other possible motion modes, such as walking (with various associated use-cases such as viewing, dangling and inside pocket, . . . ), driving, traversing stairs, riding in elevators or on conveyers/escalators.

One class of suitable techniques for detecting cart motion mode may be based on a statistical analysis. Different statistical metrics may be applied to successive data windows. Examples of useful metrics include inner product, template matching, and chi-square, although other appropriate statistical metrics may be employed as desired. Some embodiments may employ statistical parameters based on accelerometers and gyroscopes measurements to derive the corresponding device motion mode. Accordingly, motion sensors data may be used in different ways to help identifying cart motion mode. Further, data from accelerometer, gyroscope, magnetometer, barometer, or GNSS (if available) can be fused together or used individually. As warranted, the raw sensor data may be processed to improve the usefulness by de-noising, levelling and/or others. Each class of sensor data may have specific features used to identify certain device or platform motion. These features may be calculated in time domain or in frequency domain. Examples of time domain approaches may include windowing features such as magnitude, average, standard deviation, peak to peak period, and others. Correspondingly, exemplary frequency domain features may include amplitudes at certain frequency bins, signal energy, frequency domain entropy and others. Additionally, a correlation coefficient may be used as a feature to represent the relation between two different sensors. Features can be represented as a scalar or vector per feature, a concatenated vector of all features, or one matrix holding all features. Moreover, the extracted features can be used as groups or subsets or it can be transformed into a different space.

As indicated, sensor data may be processed as desired, such as by employing a low pass filter for noise reduction. Further, accelerometer and gyroscope readings may be levelled using the roll and pitch angles values followed by removing the gravity value from the vertical accelerometer of the leveled data. Subsequently, the features noted above or others may be extracted from the time-domain and/or frequency-domain characteristics of the leveled acceleration data and angular rate data.

Figure 4:
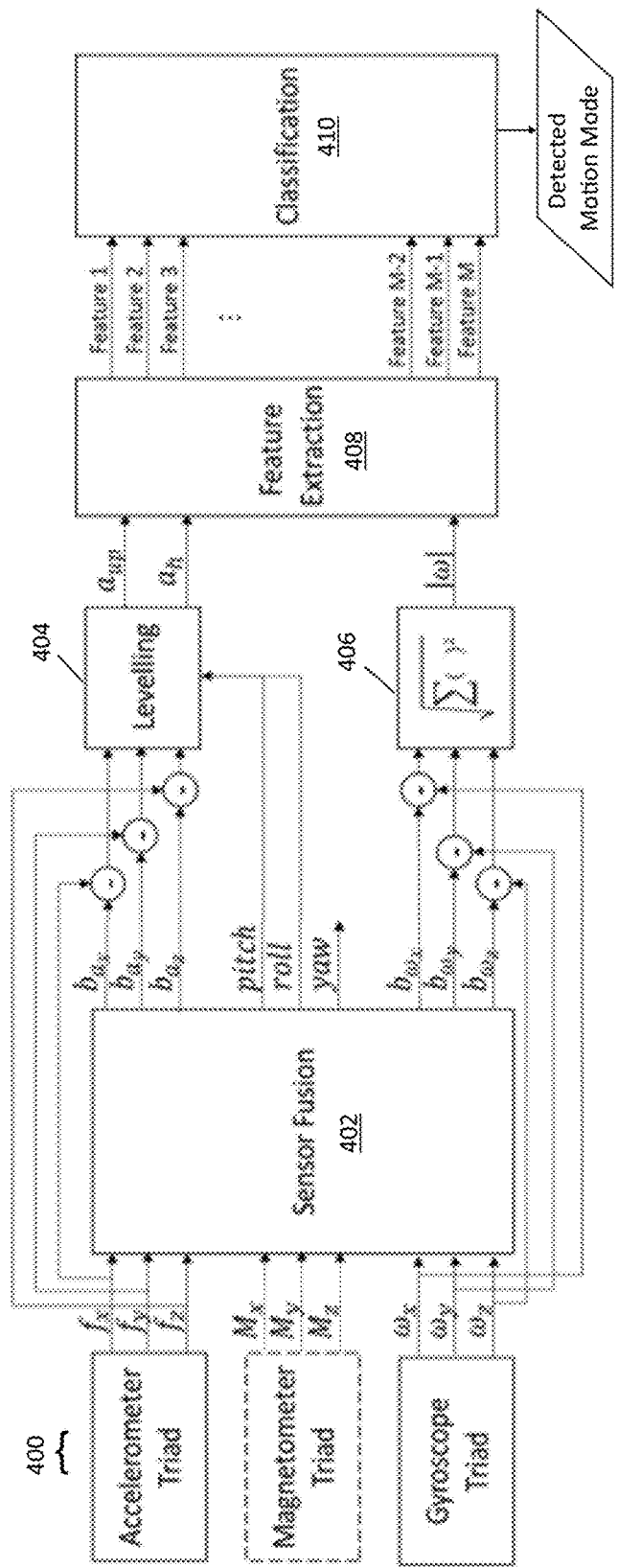
FIG. 4 is a schematic representation of a machine learning technique to be used for cart navigation according to an embodiment.

Another class of approaches that may be applied when detecting cart motion mode include those based on machine learning. To help illustrate, FIG. 4 depicts one embodiment of a machine learning approach, involving a classification model built using different types of statistical, time-domain, and frequency-domain features extracted from a large set of training trajectories. Initially, the raw sensor measurements may be integrated to come up with more meaningful variables or quantities. For example, the raw specific force and rotation measurements 400 may be integrated in a sensor fusion process 402 using a Kalman filter that attempts to estimate the bias errors of the sensor signals using a zero velocity update (ZUPT), previous GNSS measurements prior to entering an indoor environment or other condition in which absolute navigational information is denied, and wireless positioning measurements, if any. As indicated, the use of magnetometer data is optional and may depend on availability. After removing the bias errors, the three-dimensional specific forces may be rotated and the gravity component may be removed in 404 to obtain different parameters such as the levelled vertical acceleration, $a_{up}$, and the magnitude of the levelled horizontal acceleration, $a_h$, while the angular rotation rates may be normalized as indicated by 406 to obtain the norm of the angular rotations, $|\omega|$.

Next, feature extraction may be performed in 408. Recognition of cart motion mode may be performed by analysis of relevant variable(s) over a window of time. In this embodiment, the accelerations and angular rotations may be windowed or buffered for a suitable length of time, such as about 3 seconds for example. Based on this window data, sufficient features to discriminate cart motion mode from other possible motion modes may be extracted for use by classifier 410. Additionally or alternatively, frequency-domain features such as the amplitude of different frequency components, and the energy of different frequency sub-bands, as well as their ratios may be used for the cart motion mode detection. Classifier 410 may use a decision tree technique or other suitable approach. In a decision tree technique, a set of nested if-then rules, each testing whether a specific feature exceeds a specific threshold, may be generated offline by training on a labelled data set. Correspondingly, the generated if-then nested rules may be evaluated in real time for the features extracted from the signals and variables described above at each window. In other embodiments, classifier 410 may employ a support vector machine, an artificial neural network, a Bayesian network, or any other machine learning or pattern recognition model, or combination thereof.

Following detection of the portable device being in cart motion mode, it may be determined whether the cart is moving or is in a stationary period as indicated with regard to 306 of FIG. 3. It will be appreciated that the moving versus non-moving status of the cart may be used to differentiate between the moving and stationary intervals. In some embodiments, the determination of whether the cart is moving may be based on statistical analysis techniques using motion sensor data, such as measurements from accelerometers and gyroscopes. Suitable statistical parameters that may be used in this determination include: i) peak to peak range in accelerometer data over an appropriate window, such as approximately 5 sec; ii) a mean of rotation rate magnitude over an appropriate window, such as approximately 2 sec; and iii) a mean of radius of rotation magnitude over an appropriate window, such as approximately 2 sec.

Since portable device 200 may be moved or tilted to any orientation within the cart either due to independent motion within the cart or due to a movement of the cart such as turns, the radius of rotation may be used to distinguish whether the cart is moving. Calculating the radius of rotation of the device may be achieved using the gyroscope and accelerometer readings or a smoothed, averaged, or filtered version thereof. The calculated radius of rotation may or may not undergo smoothing, averaging, or filtering as well. A threshold value may be used to classify the values of the calculated radius of rotation to relatively smaller and relatively larger values. Smaller values of the radius of rotation indicate independent device motion while larger values may indicate motion due to maneuvering of the cart.

One suitable technique for calculating the radius of rotation of portable device 200r may depend on its angular velocity ω, angular acceleration ω̇ and translational acceleration a; both the angular velocity and the angular acceleration may be obtained from gyroscope measurements, while the translational acceleration may be obtained from accelerometer measurements after removing the gravitational component. Removing the gravitational component from the accelerometer data may require leveling the device axis to the horizontal plan. Optionally, the gyroscope and accelerometer readings may be smoothed, averaged, or filtered, such as for example smoothing or averaging a history of the gyroscope readings before using them to calculate the angular acceleration. Equation (1) illustrates the relation between the translational velocity V of an object and its rotational velocity ω, where R is the radius of rotation vector where can be represented by $[R_x, R_y, R_z]^T$.

$$V = \omega \times R \tag{1}$$

This equation may then be differentiated to generate Equation (2):

$$a \times \dot{V} = \dot{\omega} \times R - |\omega|^2 R = [\{|\dot{\omega}_x|\} - |\omega|^2[I]]R \tag{2}$$

in which a is the translational acceleration vector, I is the identity matrix, and ω̇ is the angular acceleration vector as given in Equation (3):

$$[\dot{\omega}_x] = \begin{bmatrix} 0 & -\dot{\omega}_z & \dot{\omega}_y \\ \dot{\omega}_z & 0 & -\dot{\omega}_x \\ -\dot{\omega}_y & \dot{\omega}_x & 0 \end{bmatrix} \tag{3}$$

Both sides of Equation (2) may be multiplied by $\{[\dot{\omega}_x] - |\omega|^2 [I]\}^{-1}$ to obtain R as indicated by Equation (4):

$$R = \{[\dot{\omega}_x] - |\omega|^2 [I]\}^{-1} a \tag{4}$$

$$= \begin{bmatrix} |\omega|^2 & -\dot{\omega}_z & \dot{\omega}_y \\ \dot{\omega}_z & |\omega|^2 & -\dot{\omega}_x \\ -\dot{\omega}_y & \dot{\omega}_x & |\omega|^2 \end{bmatrix}^{-1} a$$

Correspondingly, the magnitude of the radius of rotation may be expressed by Equation (5), where e $R_x$, $R_y$, and $R_z$ are the three components of the B vector in the x-axis, y-axis, and z-axis direction respectively:

$$r = |R| = \sqrt{R_x^2 + R_y^2 + R_z^2} \tag{5}$$

Figure 5:
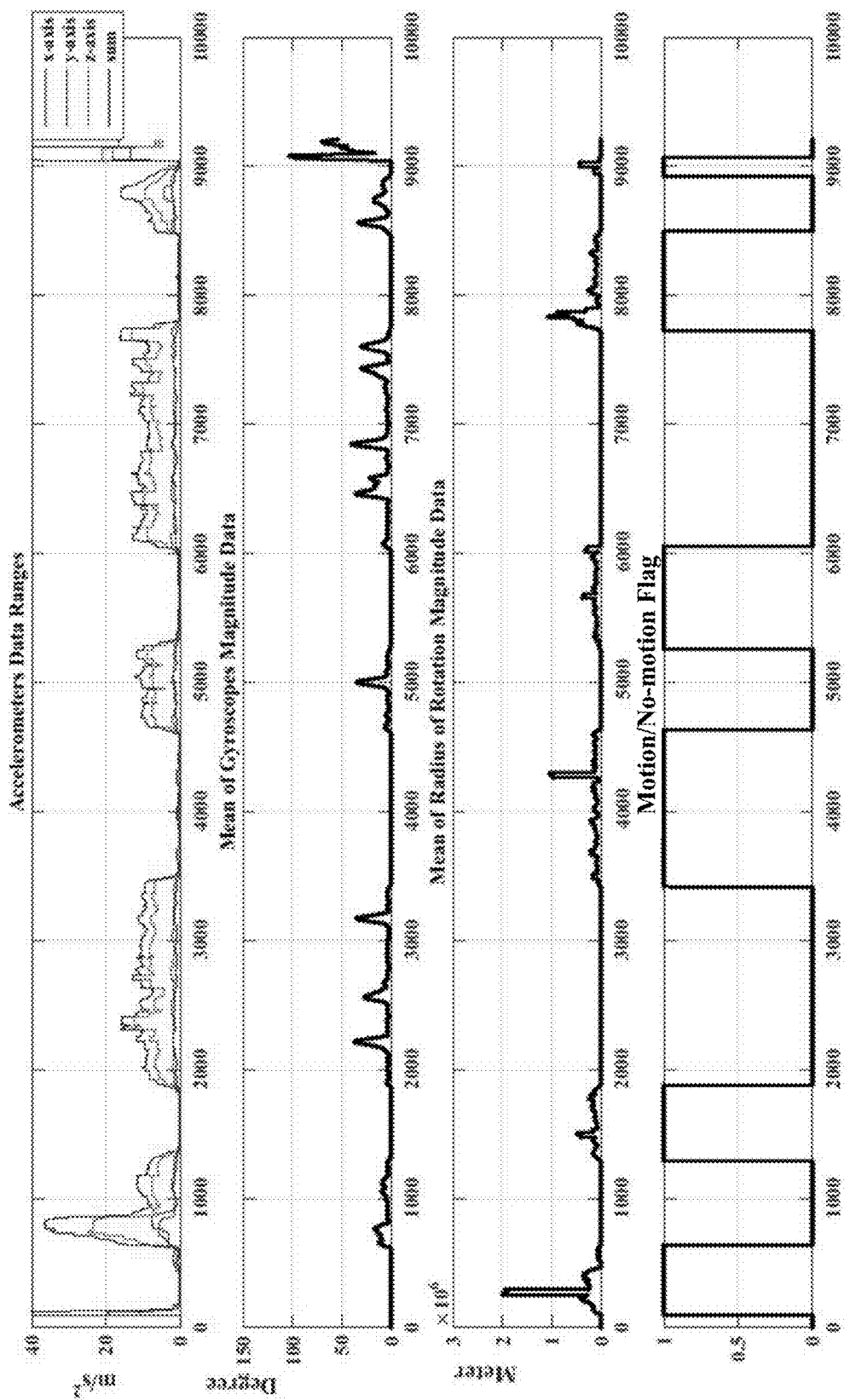
FIGS. 5-7 are graphical representations of results of determination if the cart is moving (i.e. motion vs no-motion) for cart, purse in cart and stroller data according to embodiments.
Figure 6:
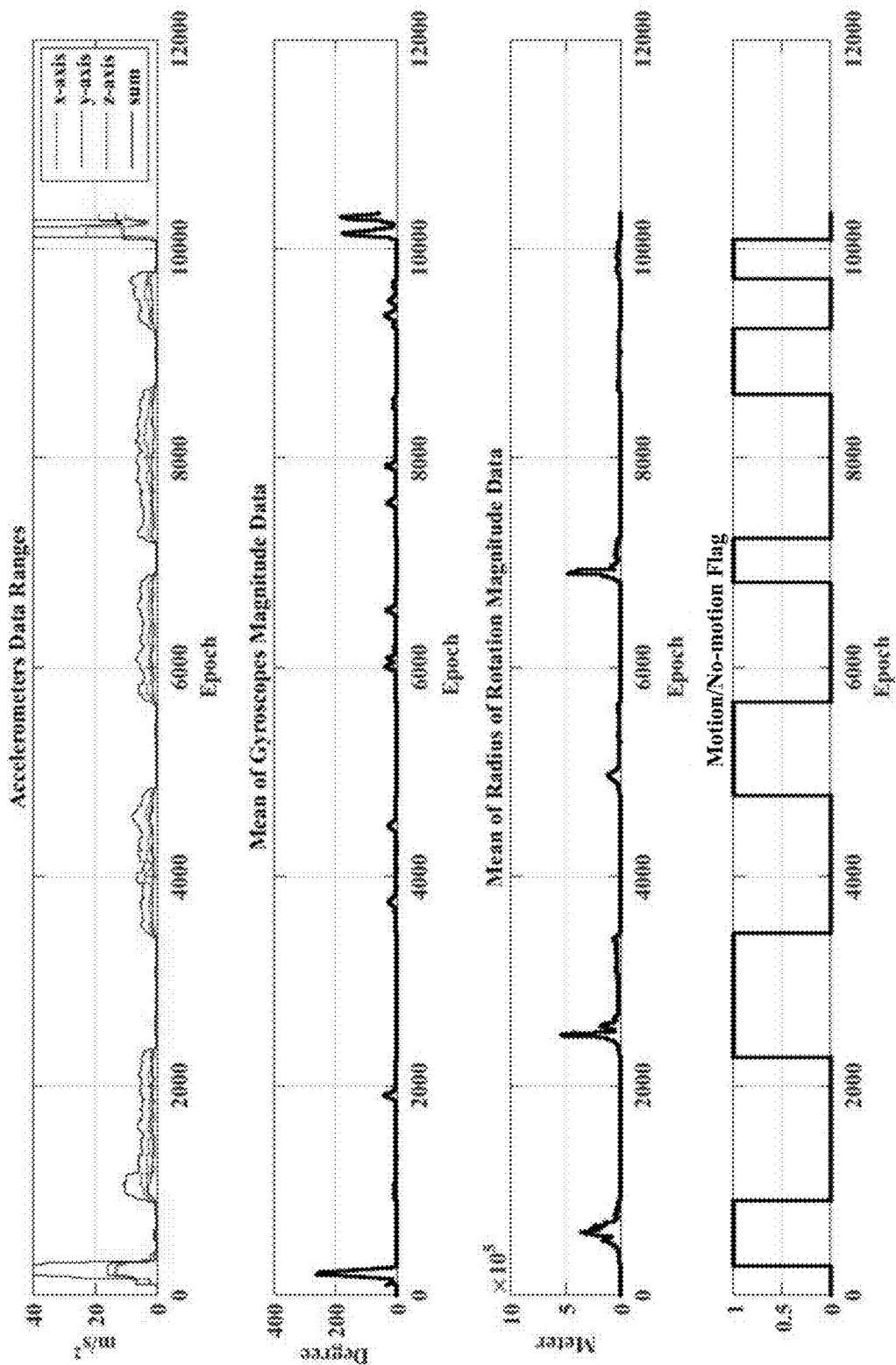
Figure 7:
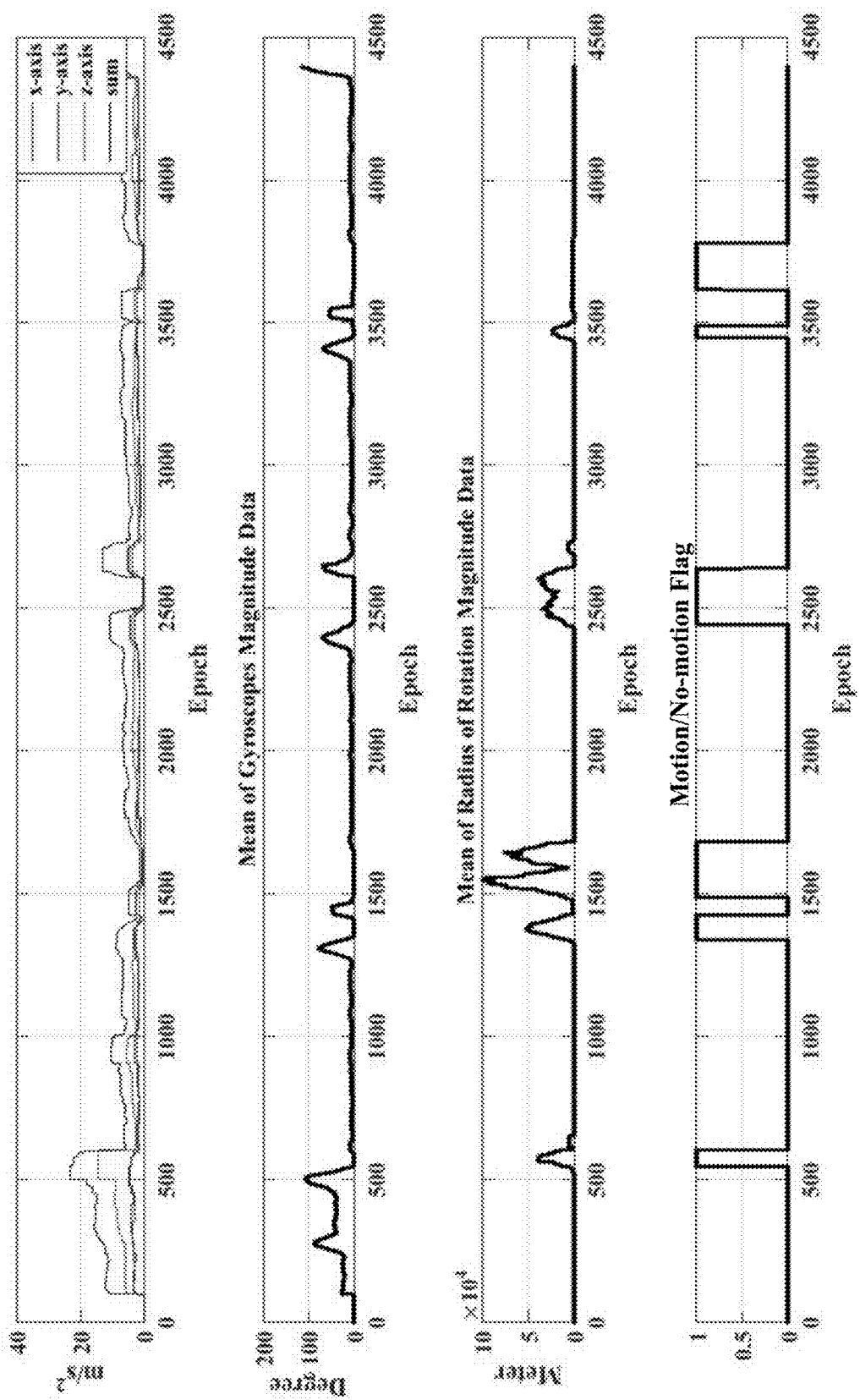

Using the indicated parameters with appropriate thresholds, stationary states and periods when the cart is being propelled by the user may be distinguished. As will be discussed below, the heading misalignment angle can be estimated to determine the cart motion direction in relation to the estimated heading of the portable device during a moving interval. Additionally, detection of steps taken by the user may also be performed. To help illustrate the relationship of the parameters used to detect movement of the cart, FIGS. 5-7 depict the derived quantities used for motion/no-motion determination for three different scenarios involving a cart motion mode. The decision made may distinguish between periods of motion for the cart, such as when being propelled by on foot motion of the user, and periods of no-motion, when the cart may be stationary. As such, a flag may be set to a value of 1, for example, when motion is detected and set to a value of 0 when no-motion is detected. FIG. 5 shows the results for a portable device resting loosely within a shopping cart, FIG. 6 shows the results for a portable device within a containing object (a purse) that is in turn placed within the shopping cart and FIG. 7 shows the results for a portable device associated with a stroller. In each depiction, the accelerometer range is shown in the top graph, the mean of the rotation rate is shown in the second from top graph, the mean of the radius of rotation is shown in the third from top graph, while the determination of moving or stationary is shown in the bottom graph. As indicated, similar relationships may be correlated with either moving intervals or non-moving intervals.

Following determination that the cart is moving, an effective motion frequency for the portable device may be determined as indicated by 308 in FIG. 3, for example. The motion sensor data of a portable device carried or placed in a cart may be significantly noisy due to the cart shaking from pushing or pulling by the user or due to a rough floor or ground. Therefore, a pre-processing step may be performed on the motion sensor data to improve the usefulness of the information. Although the following discussion is in the context of accelerometer data, similar techniques may be applied to other types of motion sensor data. In particular, appropriate frequency domain representation methods (e.g. Fourier transform or wavelet) can be used to remove the noise and any other unwanted disturbing signals in frequency domain. Fast Fourier Transform (FFT) representation may be used to determine the signal frequency, or effective motion frequency. In turn, this frequency may be used to reconstruct the acceleration data in the time domain after getting removal of unwanted noise and vibration components. FFT may be used to compute the Discrete Fourier transform (DFT) and the inverse (IDFT). This analysis converts the represented data from the time domain into frequency domain (or wavenumber) and vice versa. The FFT-based approach aims to find the effective frequency for each window time of five-seconds leveled acceleration axis data. The $k^{th}$ Discrete Fourier Transform (DFT) component with FFT of N points can be calculated using Equation (6):

$$Y_k = \sum_{i=1}^{N} \left( X(i) * e^{-\left(\frac{j2\pi(k)(i-1)}{N}\right)} \right) \text{ where } 0 \leq k \leq \frac{N}{2} + 1 \quad (6)$$

Each $k^{th}$ component of the FFT consists of two parts; real and imaginary parts as R+Ij. The amplitude of the $k^{th}$ component may be determined using Equation (7):

$$|Y_k| = \frac{2}{\text{window\_size}} \left( \sqrt{R^2 + I^2} \right) \text{ where } 0 \leq k \leq \frac{N}{2} + 1 \quad (7)$$

The corresponding frequency of each component may then be calculated using Equation (8), where the DC component is represented by $f_k(0)=0$ Hz and $F_s$ is the sampling frequency, such that each frequency step is equal to $F_s/N$:

$$f_k(i) = F_s * \frac{i}{N} \text{ where } 0 \leq i \leq \frac{N}{2} a \quad (8)$$

Figure 8:
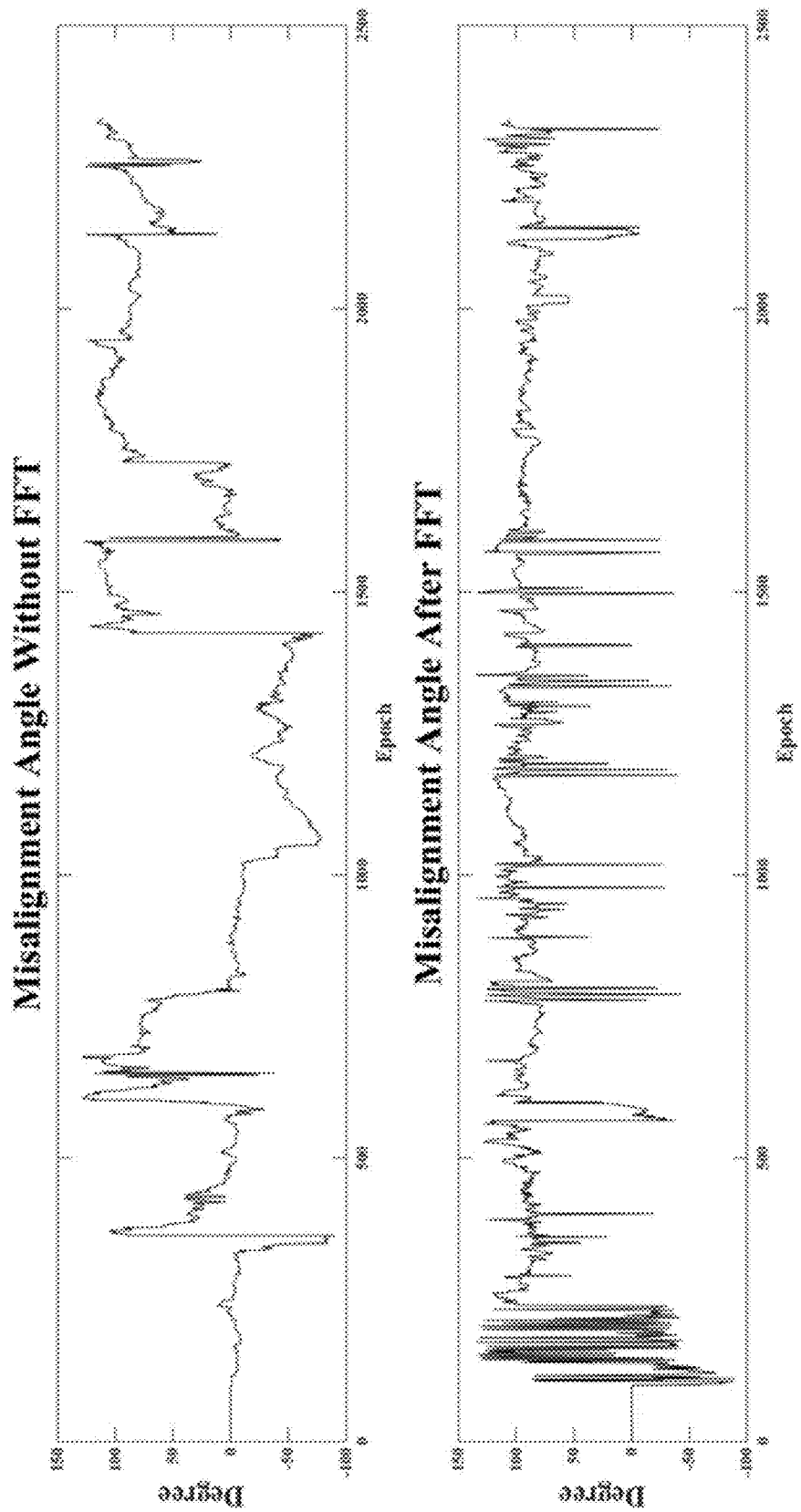
FIG. 8 is a graphical representation of misalignment solutions with and without motion sensor data reconstruction according to an embodiment.

The frequency with the maximum amplitude for each accelerometer signal may be considered as the effective motion frequency. Each signal may then be reconstructed using the DC components, real coefficient, and the imaginary coefficient of the effective motion frequency. Therefore, the reconstructed data may be used to calculate the heading misalignment angle between the cart's motion direction and the portable device's forward direction as discussed below. Similarly, the effective motion frequency may be used when detecting user steps, also as discussed below. The reconstruction of the motion sensor data facilitates the step detection process as the relation between the cart and the user movements may be too weak and indirect otherwise. The benefits of motion sensor data reconstruction may be appreciated by comparing representative results obtained for heading misalignment angle as shown in FIG. 8. During the tests, the portable device was at a 90° heading misalignment angle and the results calculated without and with reconstruction are depicted in the top and bottom graphs, respectively. As may be seen, a more consistently accurate heading misalignment angle corresponding to the actual 90° was calculated when using reconstructed motion sensor data in the bottom graph, while the heading misalignment angle in the top graph obtained without reconstructed motion sensor data ranges from approximately from −80° to 120°.

Figure 9:
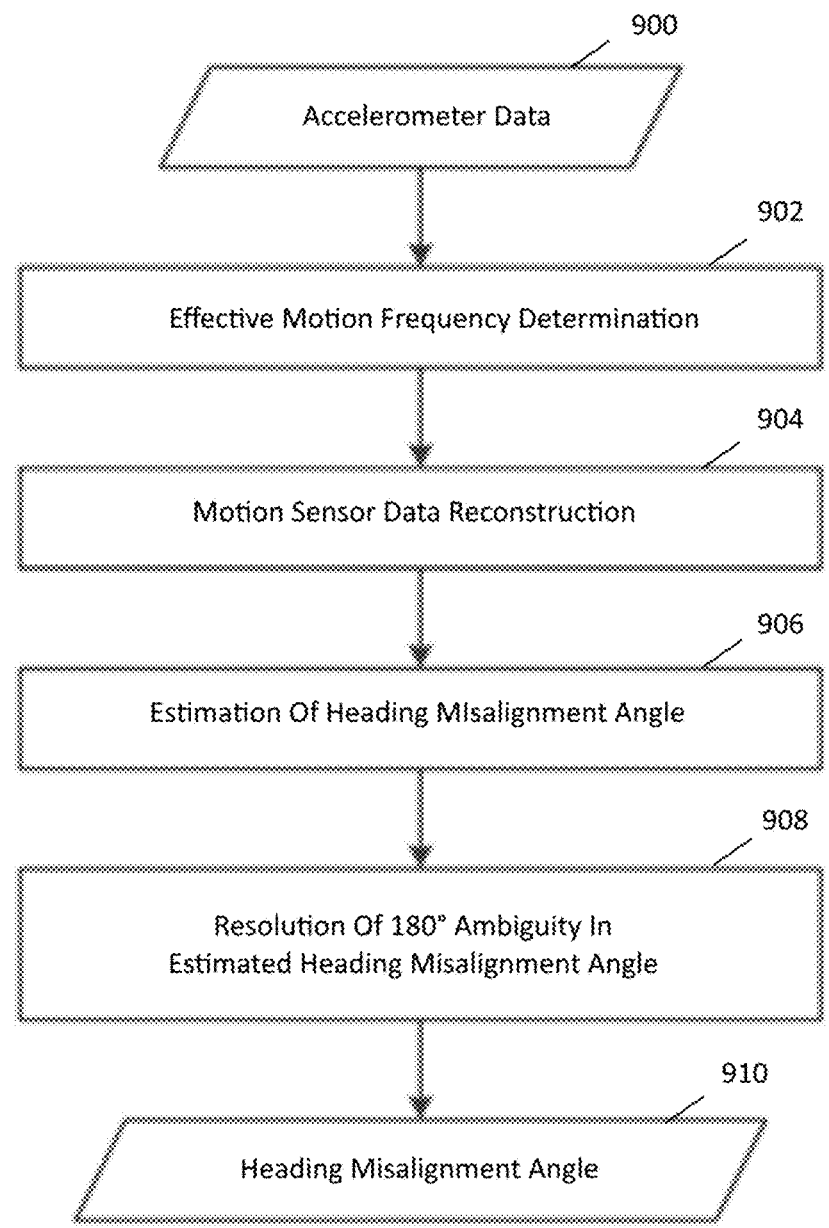
FIG. 9. is a flowchart showing a routine for estimating heading misalignment angle according to an embodiment.

Correspondingly, the heading misalignment angle between the user direction of motion and the device forward direction may be estimated using data from the motion sensors, including reconstructed motion sensor data. Different approaches such as maximum variance based techniques may utilize the sensors measurements to derive the heading misalignment angle. However, using the sensors data without removing the noise, the disturbance and the vibration may lead to incorrect or inaccurate estimation of the heading misalignment angle value as shown in FIG. 8. As a result, the jitter in the motion sensors signal add more weight to the false direction of motion. This leads to an erroneous and/or noisy estimation (e.g. the side-track motion direction is contributing more than the along-track motion direction). In turn, error in the estimated misalignment angle value may significantly impact the estimated direction of motion for the cart. Hence, removing noise, disturbances and vibrations from the measurement may aid the navigation system in providing an accurate user direction of motion. One suitable routine is schematically represented in FIG. 9. Beginning with 900, accelerometer data for a portable device being conveyed by a cart is obtained. In 902, an effective motion frequency is determined for the motion sensor data as discussed above. Correspondingly, the motion sensor data may be reconstructed in 904 to reduce vibration, disturbance and/or other sources of noise in the signal. Following reconstruction, an initial estimation of heading misalignment angle may be made in 906. Since the initial estimation may not reflect the true forward or backward motion of the portable device, there is an ambiguity of 180° in this determination. As such, the ambiguity may then be resolved in 908 to allow output of a final heading misalignment angle estimation in 910. More details regarding these operations are discussed in the following materials.

Figure 10:
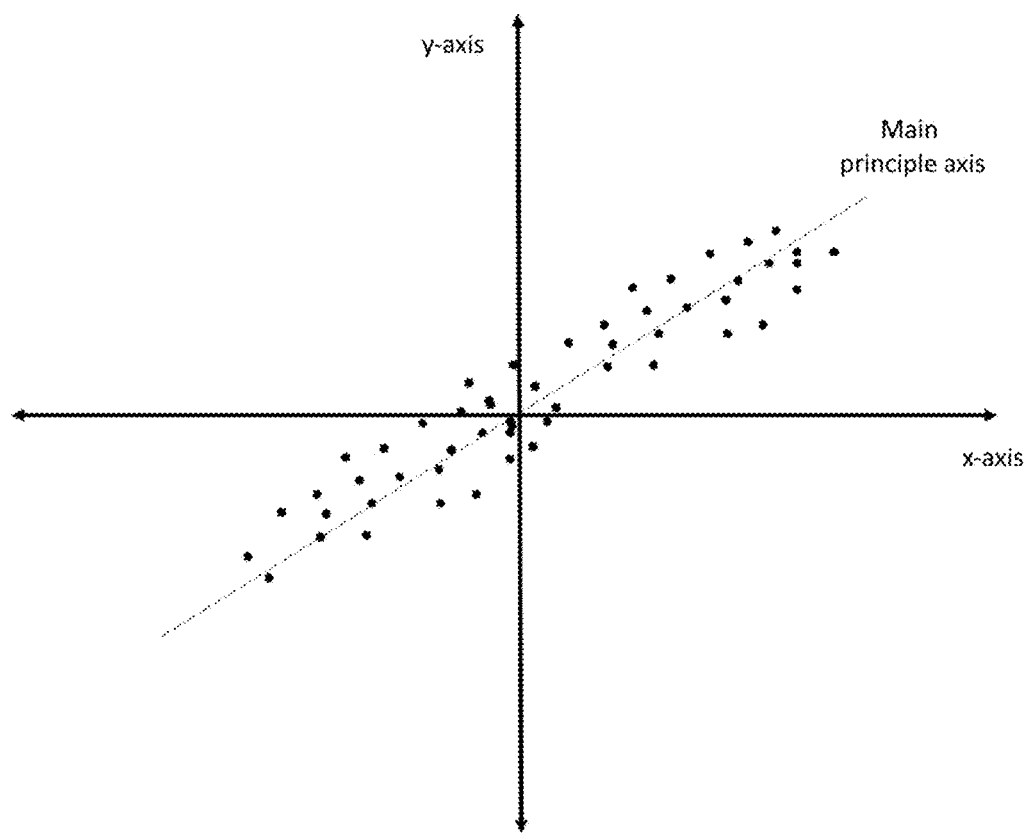
FIG. 10 is a graphical representation of a maximum variance technique for determining an along-track axis according to an embodiment.

For the initial estimation of heading misalignment angle, a maximum variance analysis between the two leveled horizontal acceleration components may be employed as depicted in FIG. 10. From a collection of data points, a main principal axis may be identified as shown. In turn, the slope of the axis exhibiting maximum variance represents the heading misalignment angle. For example, this slope can be characterized as an axis where the sum of squared distances between the inertial sensor data and the platform direction axis is minimized. Calculation of this distance may be represented by Equation (9), in which a, b, and c are the coefficients of the line equation ax+by+c=0 and ($x_o$ and $y_o$) are the x-axis and y-axis coordinates respectively of the sensor readings:

$$D = \frac{|ax_o + by_o + c|}{\sqrt{(a^2 + b^2)}} \quad (9)$$

The mean value of the data may be subtracted before using the data to calculate the heading misalignment angle, allowing c and b to have the values 0 and −1 respectively, resulting in the simplified version shown in Equation (10):

$$D = \frac{|ax_o - y_o|}{\sqrt{a^2 + 1}} \tag{10}$$

Figure 11:
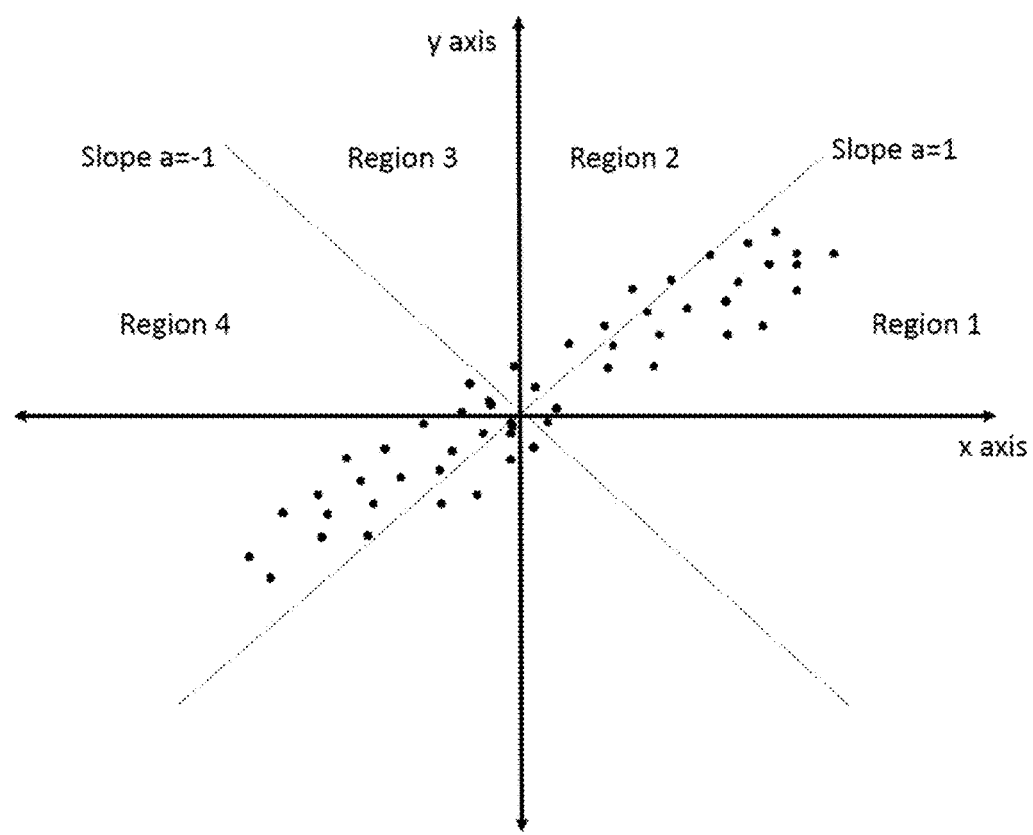
FIG. 11 is a graphical representation of a maximum variance technique for determining an along-track axis using a binary search according to an embodiment.

In one aspect, an iterative binary search technique may be used to find the along-track axis of the platform from the inertial sensor data. During a first iteration, a 180° searching area may be divided into four equal regions (45° each) as shown in FIG. 11. Each subsequent iteration then divides the searching region by 2, resulting in a second searching area range 22.5° and a third searching area range of 11.25° degrees and so forth. Equation 10 may be used to calculate the sum of the squared distances between inertial sensor measurements and the axes of the current iteration, which initially may be the x axis, the y axis, the +1 slope axis, and the −1 slope axis. A first region between the initial axes representing the two minimum sums of squared distances correspondingly contains the principle axis of maximum variance, which may be seen to be Region 1 in this example.

Figure 12:
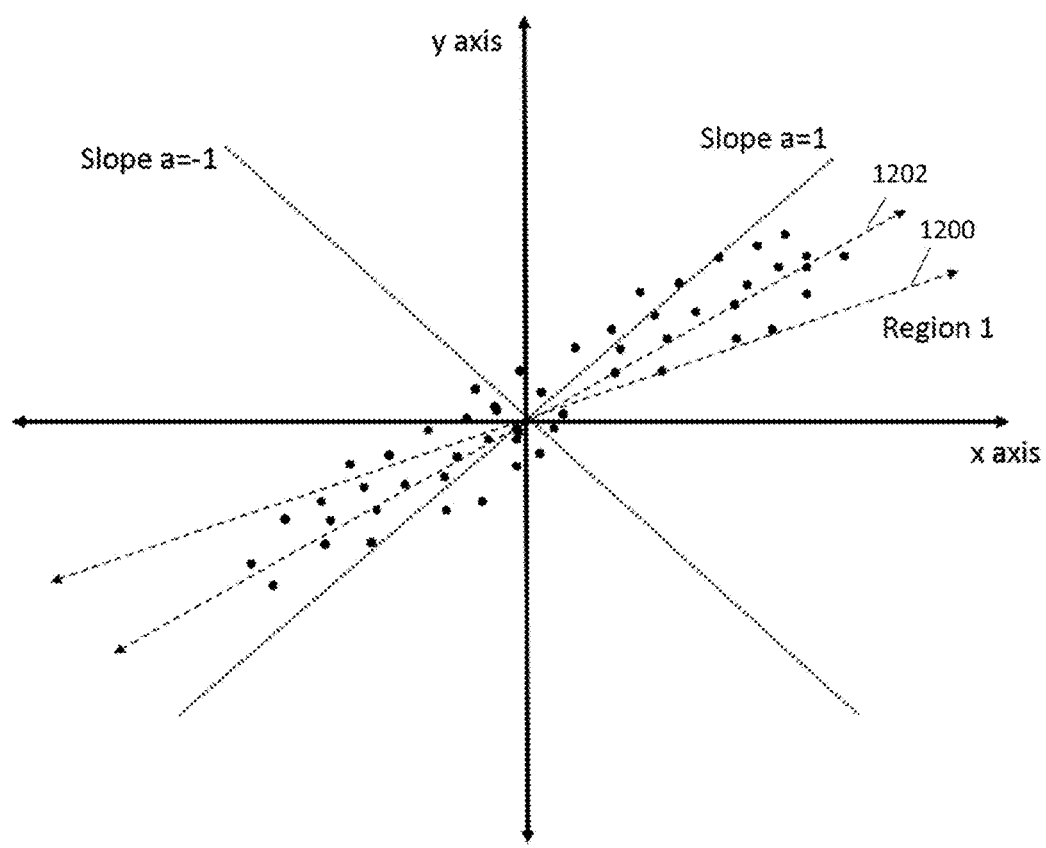
FIG. 12 is a graphical representation of a maximum variance technique for determining an along-track axis of a subsequent iteration of a binary search according to an embodiment.
Figure 13:
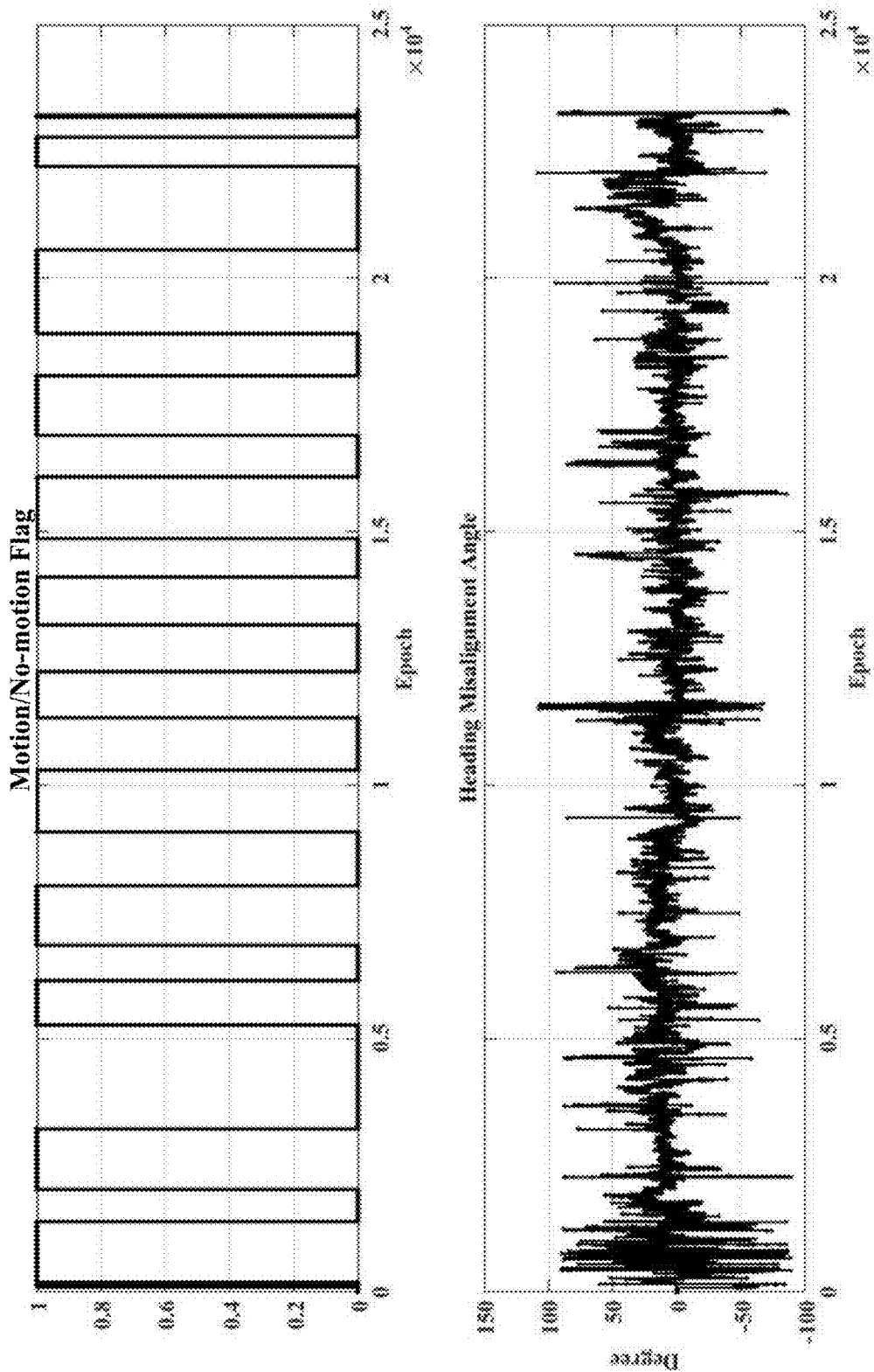
FIGS. 13-22 are graphical representations of various heading misalignment estimation scenarios for cart and purse in cart data according to embodiments.
Figure 14:
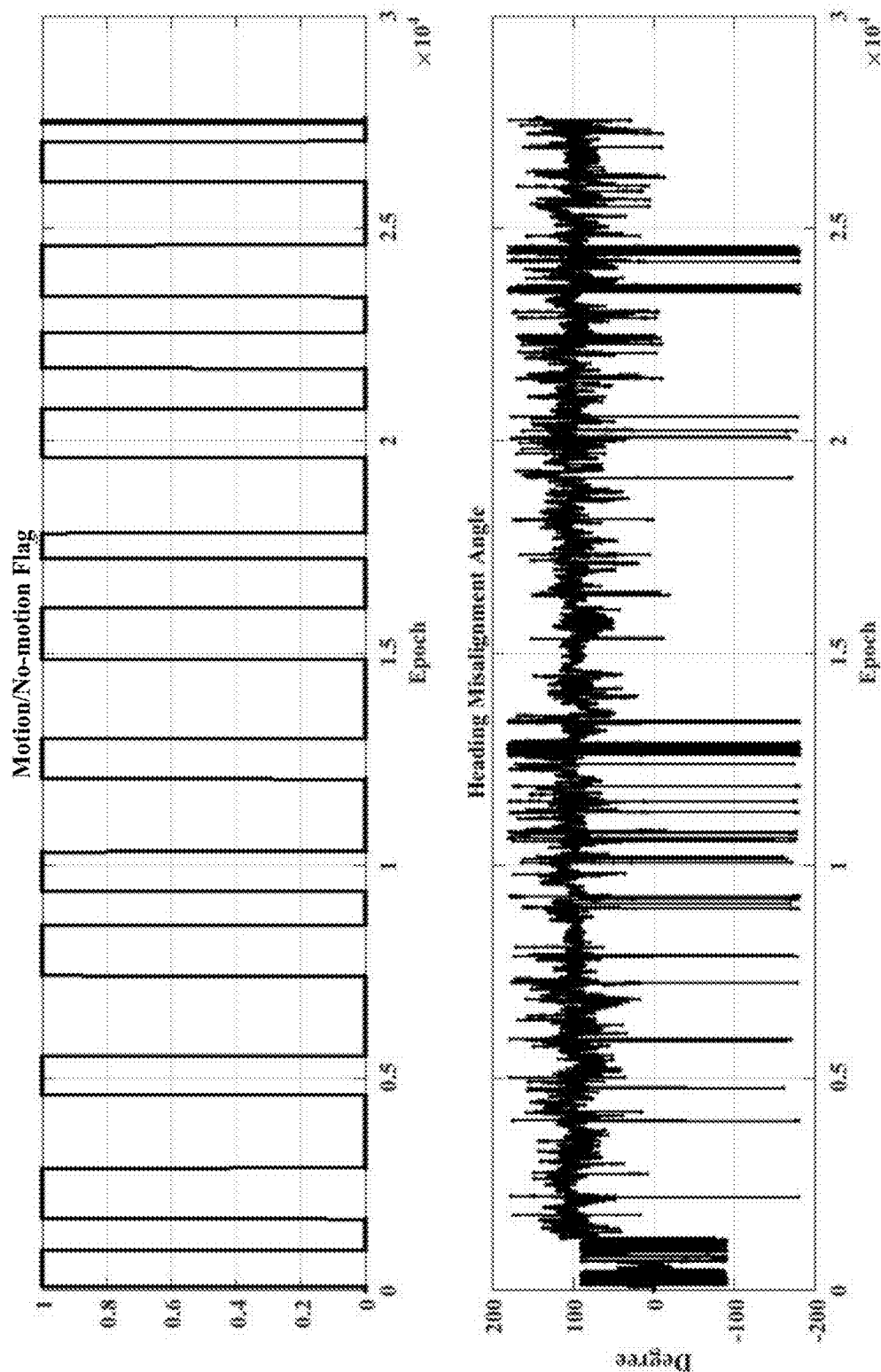
Figure 15:
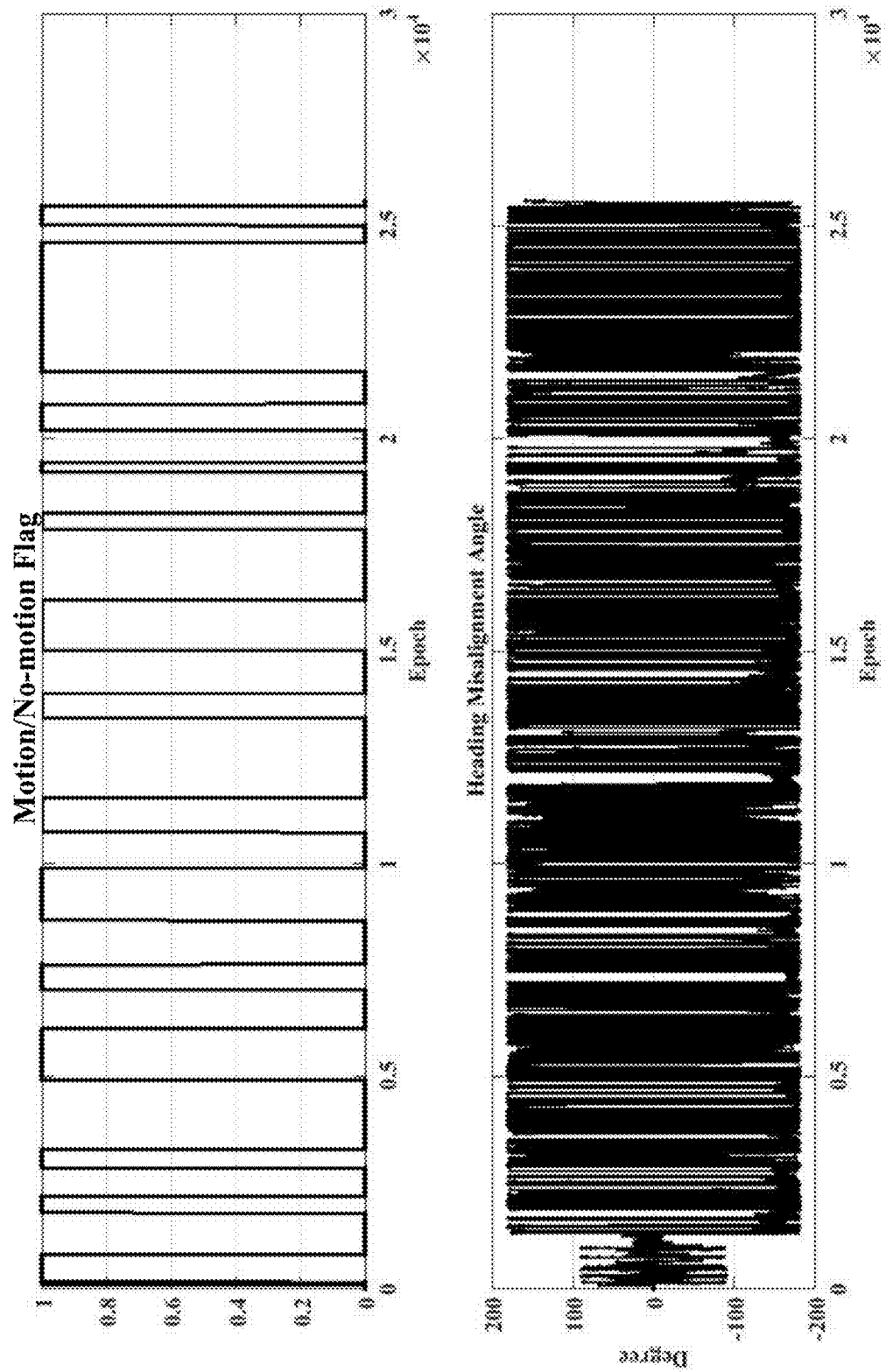
Figure 16:
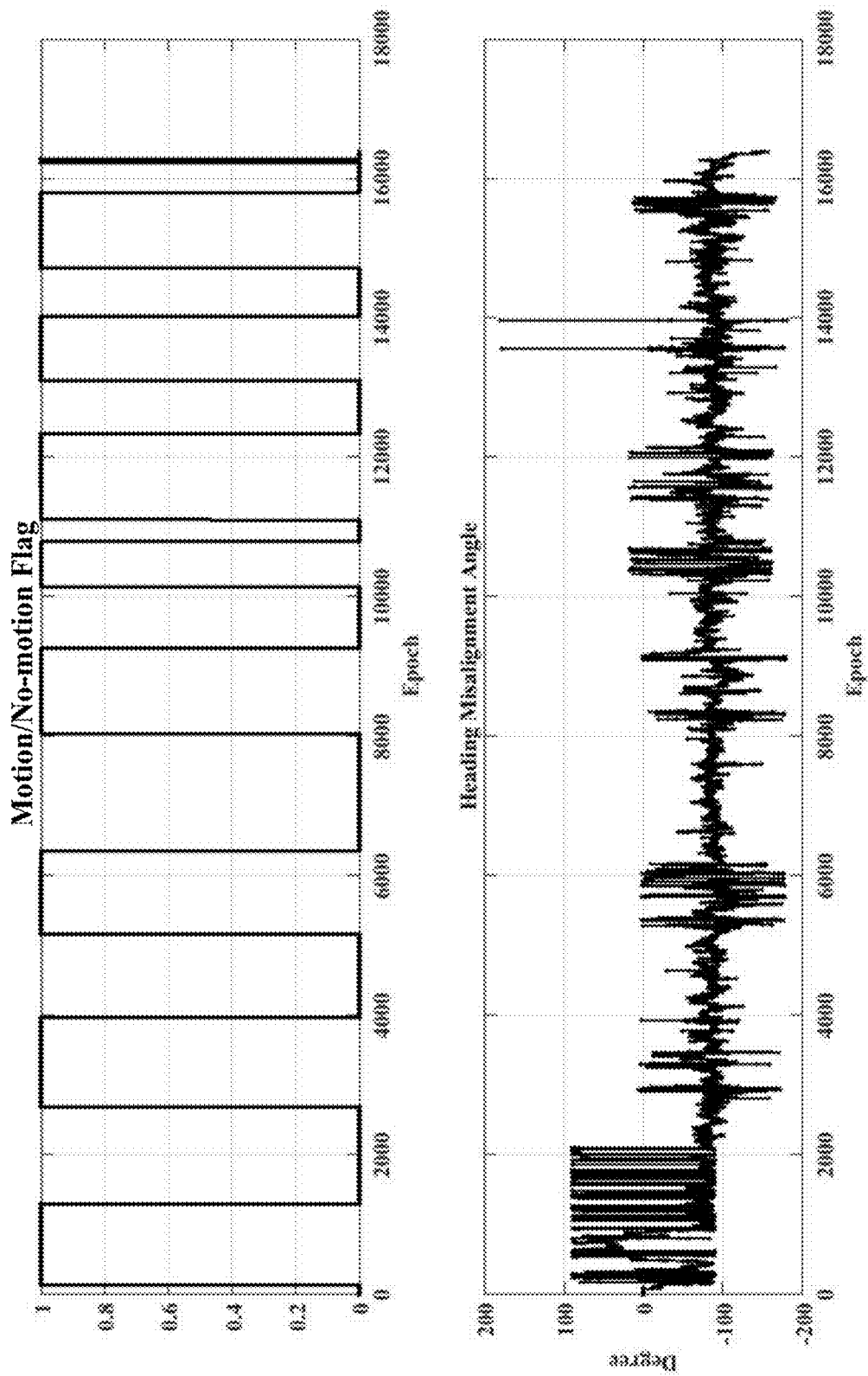
Figure 17:
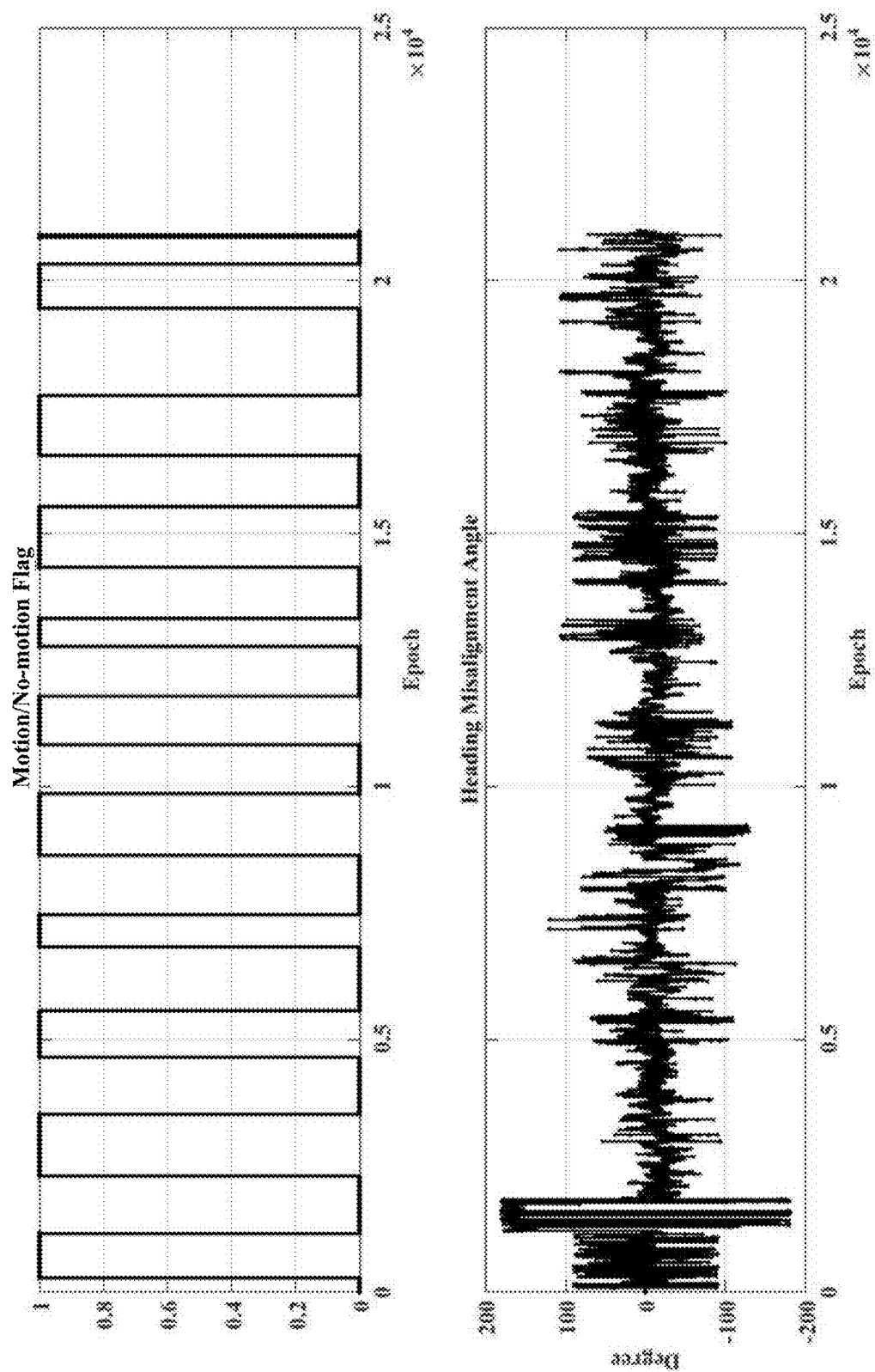
Figure 18:
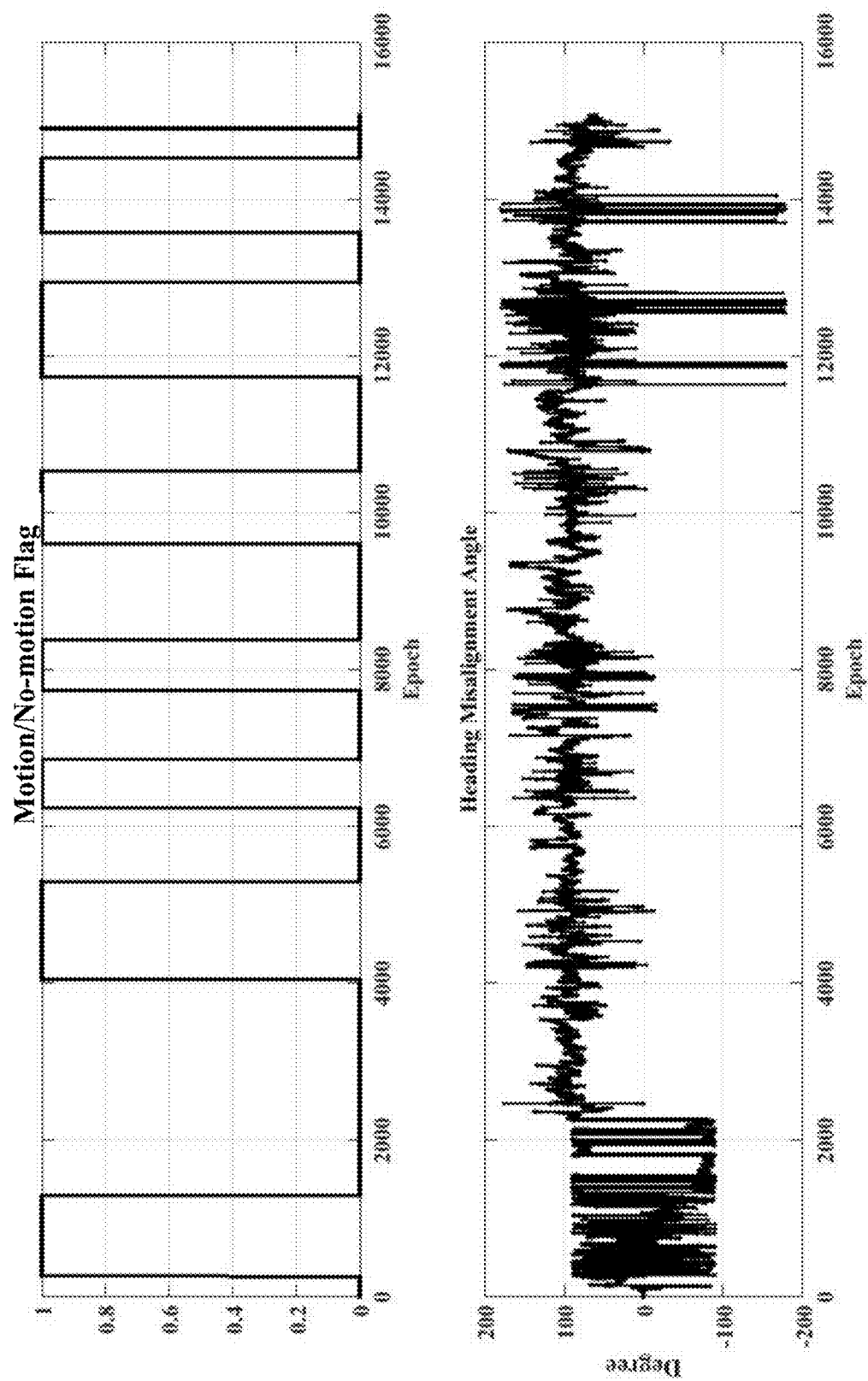
Figure 19:
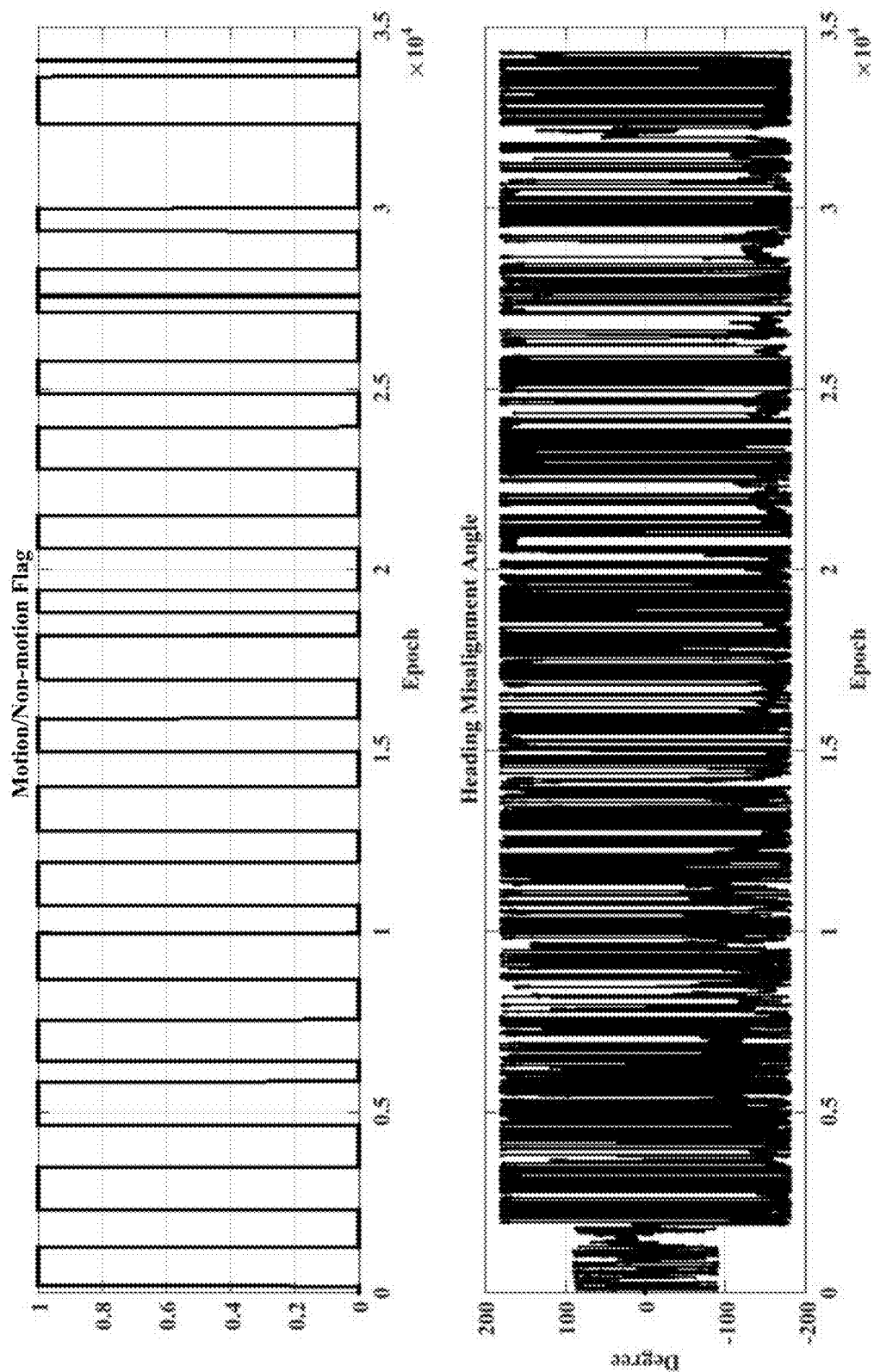
Figure 20:
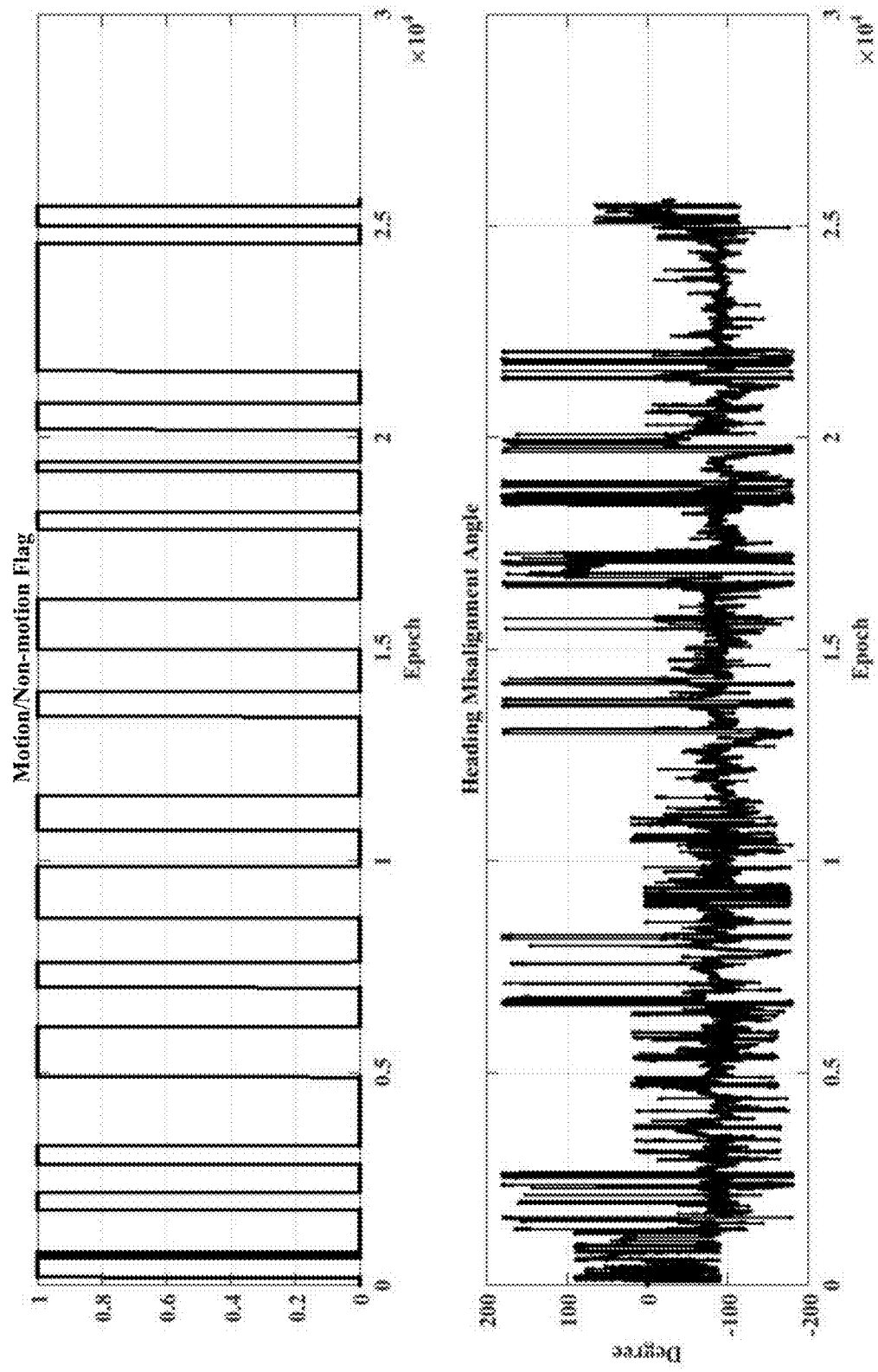

Upon identification of the first region containing the principle axis, a new axis may be introduced to divide this region in two. The routine iterates as described above, such that a next region between two of the dividing axes representing the two minimum sums of squared distances is identified. This next region is divided again and the routine may be repeated as desired until a sufficient degree of accuracy is achieved. Where n represents is the number of iterations, the accuracy of the calculated direction of the platform along-track axis is 90/(2$^n$)°. A further example of this routine is depicted in FIG. 12. Following initial identification of Region 1 as described in reference to FIG. 11, a first new dividing axis 1200 is introduced. By computing the minimum sums of the squared distances, the principle axis may be found to lie in the region bounded by the +1 slope axis and dividing axis 1200. Correspondingly, a second new axis 1202 is introduced to divide this region in two, and the routine repeats as noted.

In one aspect, an analytical technique may be used to find the along-track axis of the platform from the inertial sensor data. The sum of squared distances values, as discussed above, may be expressed as a function of the slope of the along-track axis of the platform. In turn, the along-track axis is the line that represents the absolute minimum value of a calculated first derivative of the sum function. For example, given N readings of the leveled x and y accelerations, a squared distances relationship may be expressed as shown in Equation (11).

$$f(a) = \sum_{i=1}^{N} \frac{(ax_i - y_i)^2}{a^2 + 1} = \sum_{i=1}^{N} \frac{a^2 x_i^2 - 2ax_i y_i + y_i^2}{a^2 + 1} \tag{11}$$

$$f(a) = \frac{a^2 \sum_{i=1}^{N} x_i^2 - 2a \sum_{i=1}^{N} x_i y_i + \sum_{i=1}^{N} y_i^2}{a^2 + 1}$$

$$f(a) = \frac{La^2 - 2Ma + K}{a^2 + 1} \text{ where, } L = \sum_{i=1}^{N} x_i^2,$$

$$M = \sum_{i=1}^{N} x_i y_i, \text{ and } K = \sum_{i=1}^{N} y_i^2$$

To help illustrate, a representative graph of the $f(a)$ function is depicted in FIG. 9, which shows that the slope of the first derivative of the distance function has a value of zero at the absolute minimum of the function.

Accordingly, the first derivative of Equation (11) may be expressed as Equation 12:

$$f(a)' = \frac{(a^2 + 1)(2La - 2M) - (La^2 - 2Ma + K)(2a)}{(a^2 + 1)^2} = \tag{12}$$

$$\frac{2Ma^2 + 2(L - K)a - 2M}{(a^2 + 1)^2}$$

Further, it will be appreciated that Equation (12) will be equal to zero and therefore Equation 10 will be at the minimum when a has the value given in Equation (13), in which A is equal to M, B is equal to (L−K) and C is equal to −M:

$$a = \frac{-B + \sqrt{B^2 - 4AC}}{2A} \tag{13}$$

In one aspect, a Principle Component Analysis (PCA) technique may be used to find the along-track axis of the platform from the motion sensor data. Before applying the PCA technique, the horizontal components are generated by levelling the acceleration data to the horizontal plan, then they are fed to the technique. In order to calculate the vector of major axis and minor axis, PCA technique is utilized. PCA is an ordination technique which involves the Eigenanalysis of the data matrix. The data matrix is composed of rows corresponding to observations, and columns to variables. PCA chooses the first PCA axis as the line that minimizes the square of the distance of each point to that line. Equivalently, this line goes through the maximum variation in the data. The first stage in PCA is to standardize the data by subtracting the mean, and then singular value decomposition (SVD) is applied to get the eigenvectors of x-axis and y-axis. The output matrix form the PCA technique contains the information of the misalignment angle. The first column in matrix represents the primary component vector and the second column represents the secondary component vector. It is important to know they are orthogonal vectors. The columns are in order of decreasing component variance. It is worth mentioning that the first value in the primary component vector means what level the x data's contribution is to the primary component vector and the second value means level of y data's contribution to the primary component. The misalignment angle can be determined by calculating the angle using the primary component vector, as shown in Equation (14), where EVx represents the first value in primary component vector and EVy represents the second value in primary component vector:

$$\theta_{mis} = \tan^{-1}\left(\frac{-EV_y}{EV_x}\right) \tag{14}$$

Figure 21:
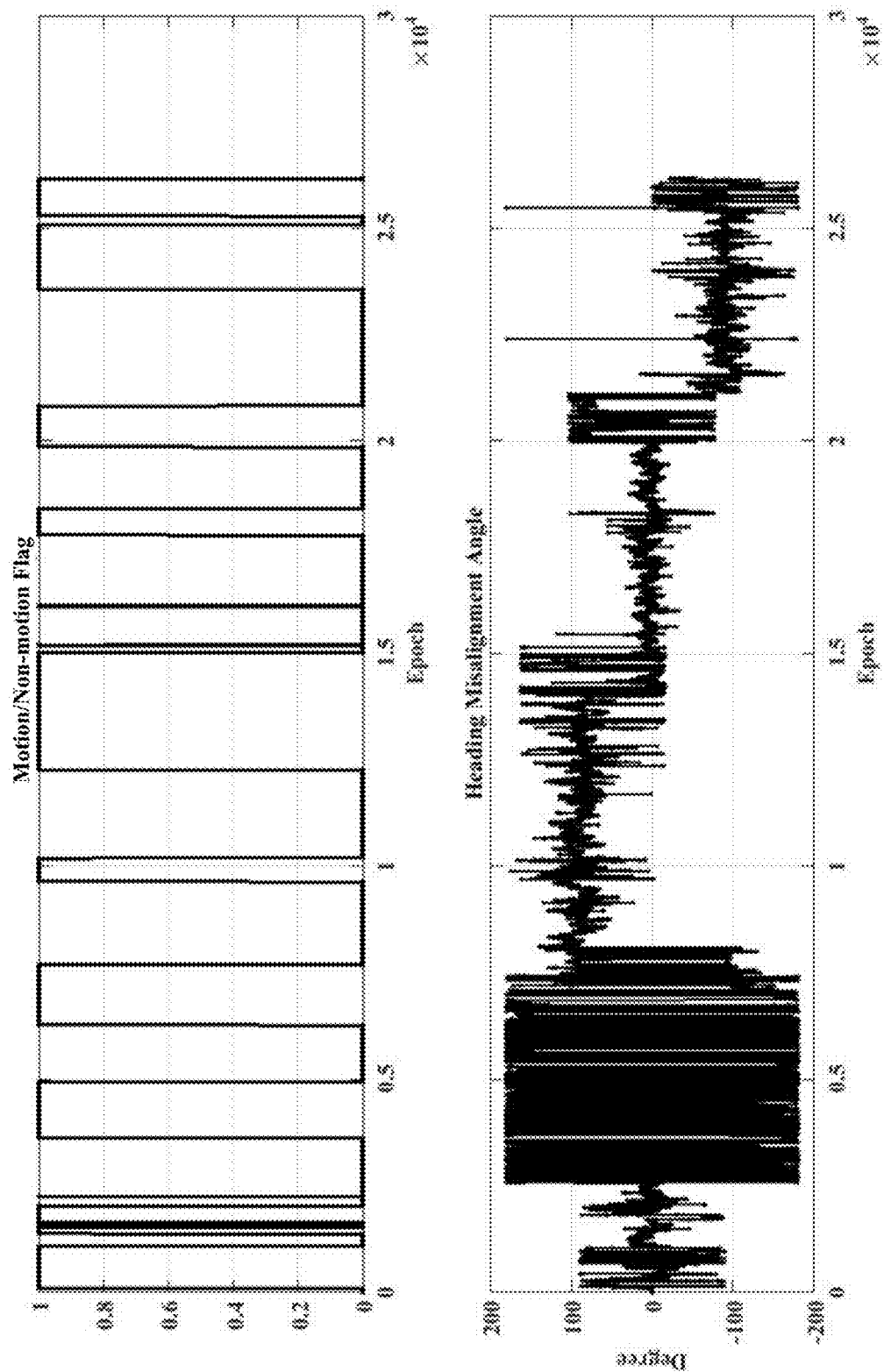
Figure 22:
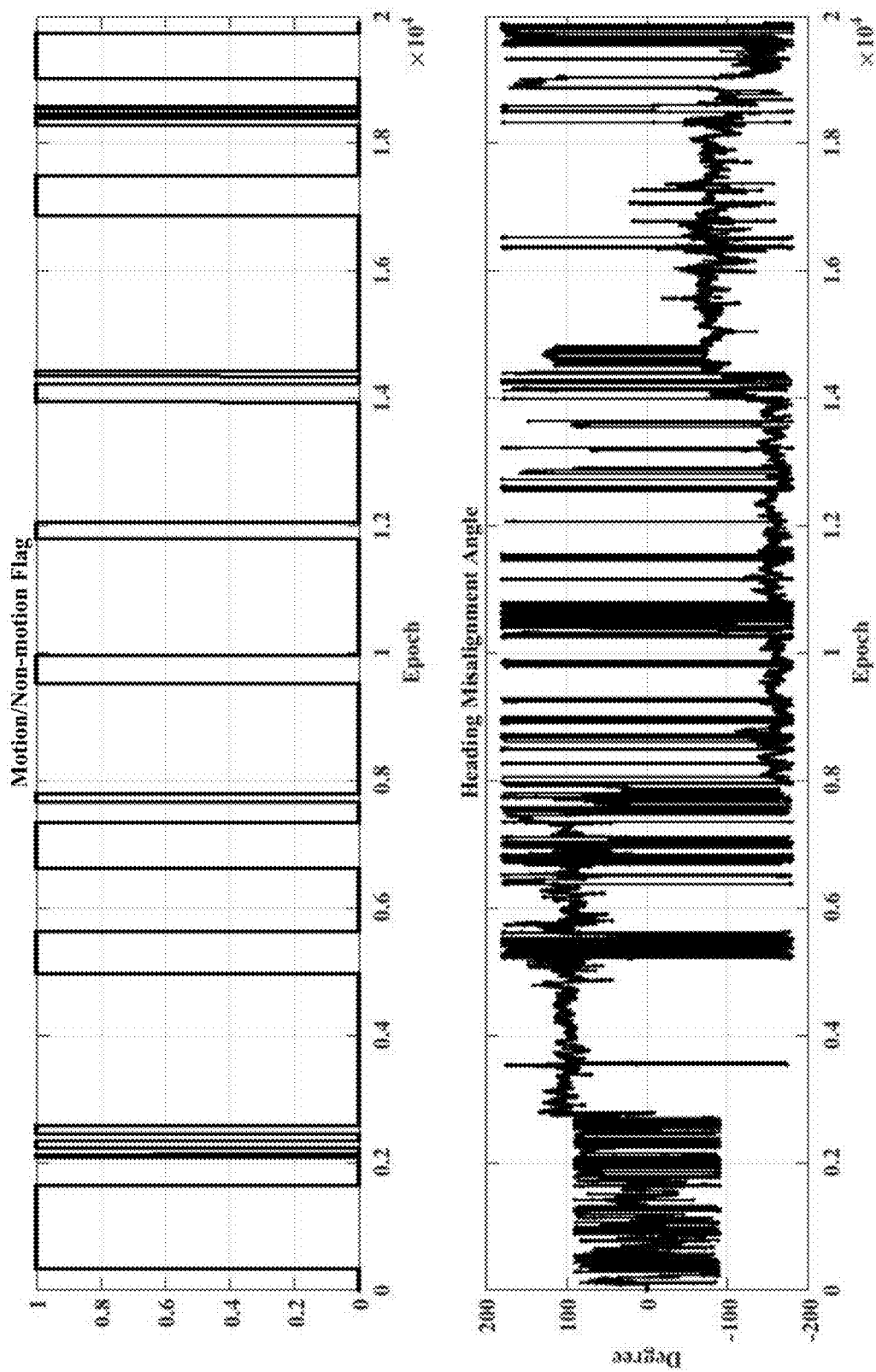

These and other suitable techniques may be used to determine the along-track axis of the platform to estimate heading misalignment angle of device 200. As noted above, such estimations may have an ambiguity in that the actual motion of the platform may be in either direction of the along-track axis, and is termed herein the "180° ambiguity." Any suitable method may be implemented to resolve the 180° ambiguity and correspondingly determine the correct direction of the motion. The implemented methods may deal with the portable device in vertical and horizontal orientations. Furthermore, these methods may deal with slow, normal and fast cart motions with various heading misalignment values. A statistical analysis technique is one example of a suitable method where various statistical parameters of motion sensor data, such as accelerometer and gyroscope data, may be calculated over certain windows. Notably, the mean of the roll and pitch angles, and the mean and the range of the vertical gyroscope data are statistical parameters that may be used to solve 180° ambiguity of the heading misalignment angle. These parameters may be calculated over a suitable data window, such as approximately two seconds. To help demonstrate these techniques, representative tests were conducted for a portable device resting alone within a cart in the form of a shopping cart or contained within another object (a purse) that is itself within the cart. For the results shown in FIGS. 13-20, the portable device was at a single heading misalignment angle, while the results shown in FIGS. 21 and 22 were conducted for the portable device being placed at varying heading misalignment angles.

Figure 23:
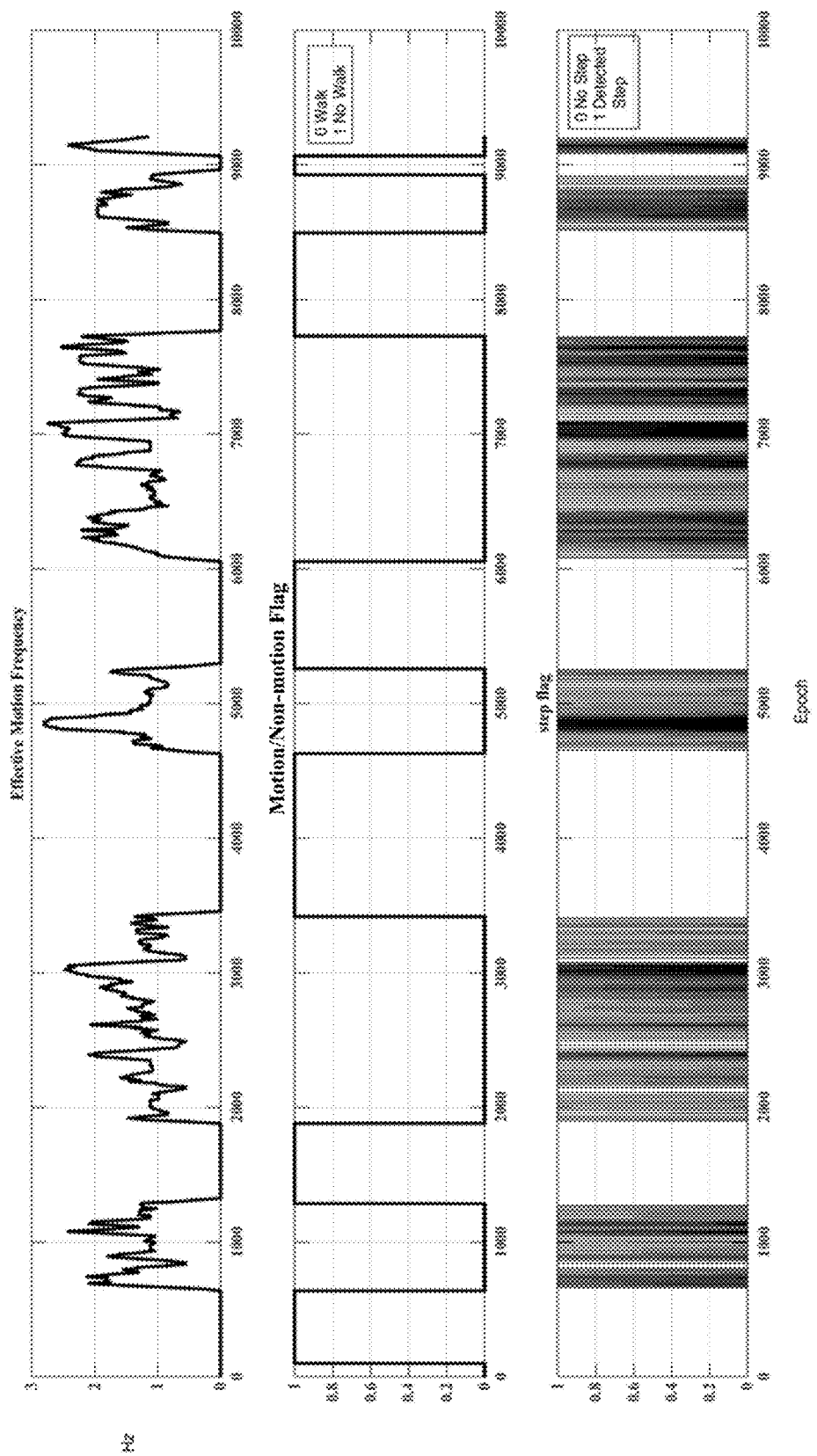
FIGS. 23-25 are graphical representations of various step detection solutions for cart, purse in cart and stroller data according to embodiments.
Figure 24:
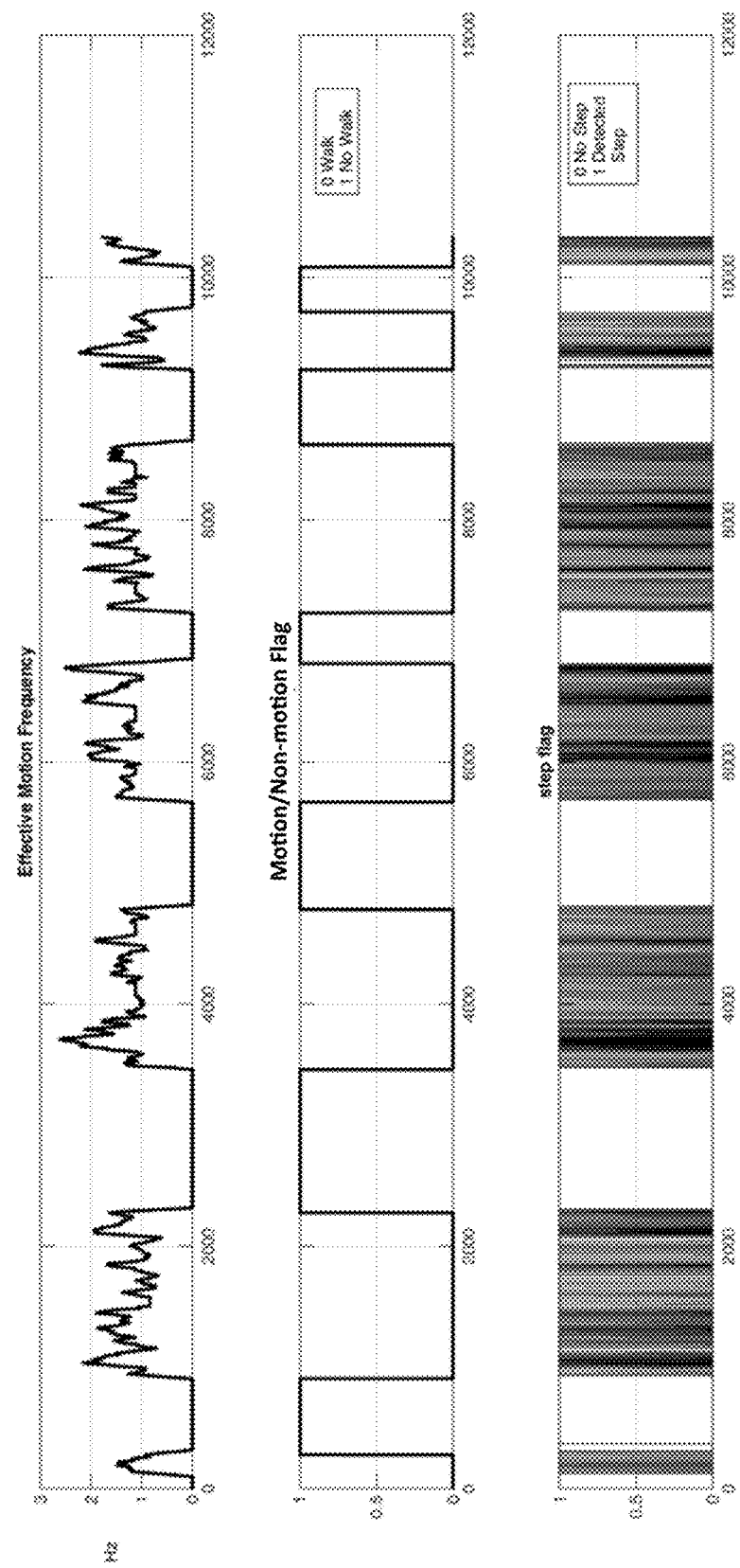
Figure 25:
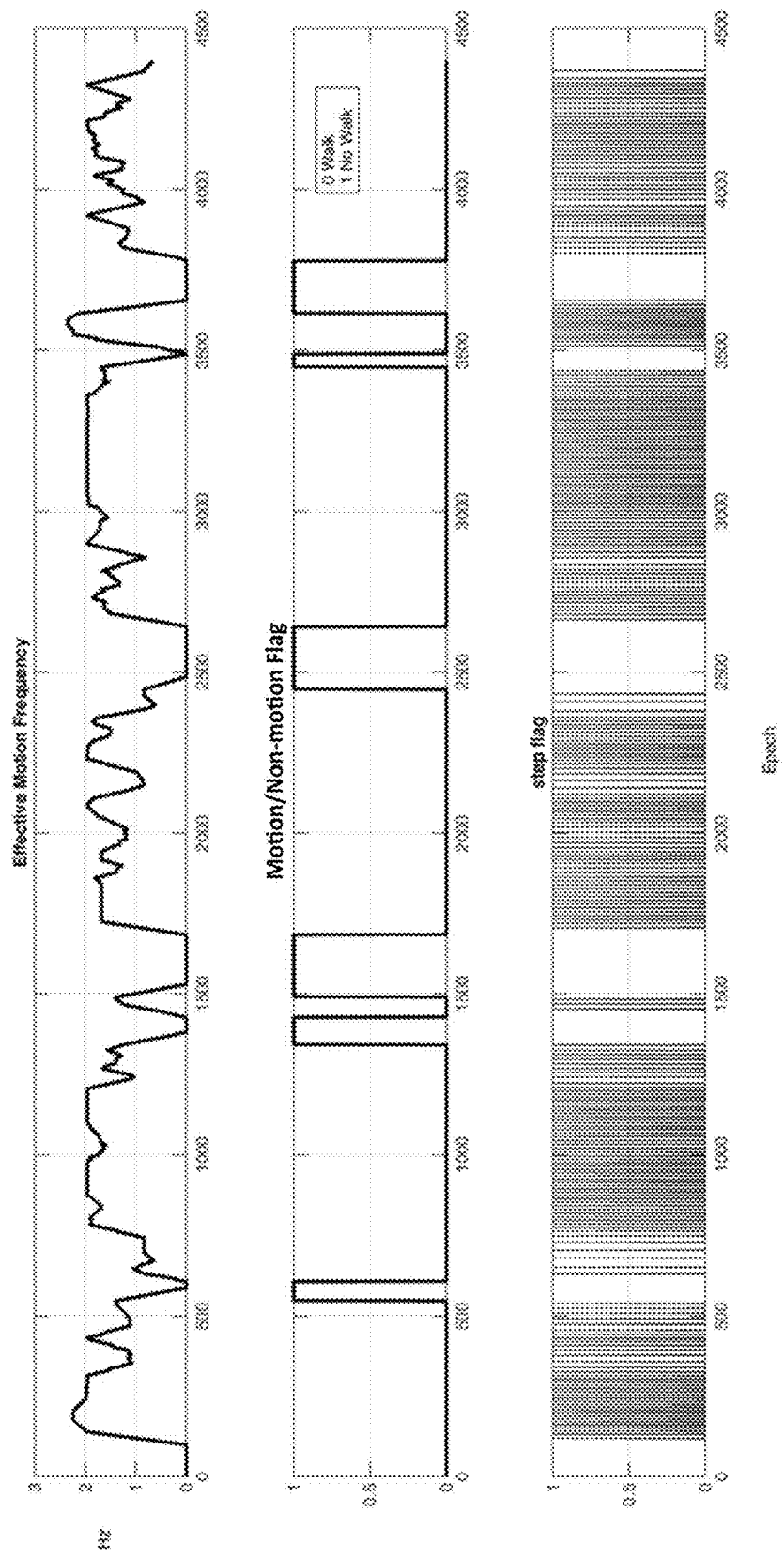

In parallel with the estimation of heading misalignment angle, the motion sensor data from portable device 200 may be used to identify steps taken by the user while propelling the cart. As will be appreciated, step detection involve the recognition of various patterns in motion sensor data, such as accelerometer data, to identify each step instance. As desired, the pattern identification may be performed on upper or lower peaks in the data, for example. When detecting steps for cart navigation dead reckoning, recognition of motion sensor data patterns may be complicated due to the lack a direct relation between the stepping motions of the user and the portable device which is being conveyed by the cart. Correspondingly, the determined effective motion frequency discussed above may also be used to help accentuate patterns associated with a user's stepping motion. For example, the effective motion frequency may be used to calculate the time interval between each two consecutive steps. Then, the calculated interval may be used during step detection to assess the time since the last detected step so that the motion sensor data may be examined more closely at a period when the next step is expected. As will be appreciated, greater confidence may be placed in the detection of a pattern corresponding to a step if that pattern occurs at a time when a step would be expected if the user is propelling the cart through on foot motion. To help illustrate these aspects, representative tests were conducted with the portable device in different cart motion modes. Specifically, FIG. 23 depicts results obtained for a portable device resting on a surface of a shopping cart, FIG. 24 depicts results obtained for a portable device within a purse in a shopping cart, and FIG. 25 depicts results obtained for a portable device within a stroller.

Using the heading misalignment angle estimation and step detection, dead reckoning may be performed to provide a navigation solution for a cart as indicated by 316 of FIG. 3, for example. A cart heading can be calculated from the device heading and the estimated heading misalignment using Equation (15), in which $\theta_P$ is the cart heading, $\theta_D$ is the device heading and is the heading misalignment angle:

$$\theta_P = \theta_D - \theta_{mis} \tag{15}$$

The device heading $\theta_D$ may be calculated using gyroscopes and/or magnetometer data if available. Also, device heading may be output from an Inertial Navigation System (INS) of the portable device or an attitude calculation system based on gyroscope and accelerometer measurements.

Thus, a position determination for the cart may be made based on dead reckoning by taking the cart heading as determined above and estimated step length to calculate a new two dimensional cart position with respect to its previous position using Equations (16) and (17), in which $P_{N,k}$ is the position component in North direction, $P_{E,k}$ is the position component in East direction, $SL_k$ is the step length between time epoch k−1 and k, and $\theta_{P,k}$ is the cart heading, and the time epoch denoted by index k corresponds to each detected step:

$$P_{N,k} = P_{N,k-1} + SL_k * \cos(\theta_{P,k}) \tag{16}$$

$$P_{E,k} = P_{E,k-1} + SL_k * \sin(\theta_{P,k}) \tag{17}$$

Further, these equations may be expressed as Equations (18) and (19), in which $\varphi_k$, $\lambda_k$, and $h_k$ represent the latitude, longitude, and altitude, respectively:

$$\varphi_k = \varphi_{k-1} + \frac{SL_k * \cos(\theta_{P,k})}{R_{M,k-1} + h_{k-1}} \tag{18}$$

$$\lambda_k = \lambda_{k-1} + \frac{SL_k * \sin(\theta_{P,k})}{(R_{N,k-1} + h_{k-1})\cos(\varphi_{k-1})} \tag{19}$$

$R_M$ may be used to represent the Meridian radius of curvature of the Earth's reference ellipsoid as given Equation (20) and $R_N$ may be used to represent the normal radius of curvature of the Earth's reference ellipsoid as given by Equation (21):

$$R_{M,k-1} = \frac{a(1-e^2)}{(1-e^2\sin^2(\varphi_{k-1}))^{3/2}} \tag{20}$$

$$R_{N,k-1} = \frac{a}{(1-e^2\sin^2(\varphi_{k-1}))^{1/2}} \tag{21}$$

In these equations, a is the semi-major axis (equatorial radius) of a Meridian ellipse of the Earth's ellipsoid a=6,378,137.0 m, e is the eccentricity $$e = \sqrt{\frac{a^2 + b^2}{a^2}} = \sqrt{f(2-f)} = 0.08181919,$$

b is the semi-minor axis of a Meridian ellipse of the Earth's ellipsoid b=a(1−f)=6,356,752.3142 m, and f is the flatness $$f = \frac{a-b}{a} = 0.00335281.$$

Accordingly, dead reckoning may be used to generate a position determination for the cart. The position output may be used as the enhanced sensors-based navigation solution, or it may be used as an update to an inertial navigation system (INS) to provide the enhanced sensors-based navigation solution. In either embodiment, the enhanced sensors-based navigation solution may be the enhanced navigation solution provided as output, or it may be integrated with absolute navigation information if/when available to provide an enhanced integrated navigation solution as the output enhanced navigation solution. Examples of absolute navigation information are: (i) a global navigation satellite system (GNSS); (ii) cell-based positioning; (iii) WiFi-based positioning; (iv) Bluetooth-based positioning; (iv) other wireless-based positioning; (v) magnetic fingerprint positioning; or (vi) visual light communication (VLC)-based positioning.

In some embodiments, a source of absolute navigation information may be an anchor point, which may be any known location for which an association may be established with the portable device. In a retail application, for example, one or more anchor points may be obtained or otherwise identified from point of sale information, each represented by the known location of items the user has purchased. A suitable database from a third party or the retailer may correlate each item with its location. As another example, the portable device may be used to run an application that involves scanning or otherwise interacting with items, such as an application provided by the retailer (one example may be to scan bar-codes of products). Upon scanning, the product location database may be queried to get a position for that item scanned and an anchor point may be established. In other scenarios, anchor points may be wireless beacons that communicate with the portable device to establish proximity between the device and the beacon, so that the current position of the device may be assumed to be the known location of the beacon. Generally, an anchor point may be anything that correlates a fixed, known position with the portable device.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different levels of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for cart navigation, the method comprising:
   a) obtaining motion sensor data from a portable device having a sensor assembly, wherein the portable device is conveyed by a cart, wherein the cart is an apparatus propelled by on foot motion of a user, and wherein: i) the method is operable when the portable device is tethered to the cart and when the portable device is untethered to the cart; and ii) the method is operable when mobility of the portable device is constrained within the cart and when mobility of the portable device is unconstrained within the cart;
   b) determining the portable device is in a cart motion mode;
   c) determining the cart is moving;
   d) determining an effective motion frequency for the portable device;
   e) reconstructing motion sensor data;
   f) calculating heading misalignment angle;
   g) detecting steps taken by the user;
   h) performing dead reckoning for the cart based at least in part on the calculated heading misalignment angle and the detected steps; and
   i) providing a navigation solution for the cart based at least in part on the dead reckoning.

2. The method of claim 1, wherein determining the portable device is in a cart motion mode comprises processing motion sensor data from the portable device.

3. The method of claim 2, wherein processing the motion sensor data comprises applying a statistical analysis technique.

4. The method of claim 3, wherein the statistical analysis technique comprises at least one of: (i) a frequency-domain analysis; and (ii) a time-domain analysis.

5. The method of claim 2, wherein processing the motion sensor data comprises applying a machine learning technique.

6. The method of claim 5, further comprising inputting features extracted from the processed motion sensor data to at least one stored classification model to determine the portable device is in a cart motion mode.

7. The method of claim 6, wherein the at least one stored classification model is developed during a training phase.

8. The method of claim 1, wherein determining the cart is moving comprises processing motion sensor data from the portable device by applying a statistical analysis technique.

9. The method of claim 8, wherein the statistical analysis technique comprises evaluating at least one of: (i) peaks in accelerometer data; (ii) magnitude of rotation rate data; and (iii) magnitude of radius of rotation.

10. The method of claim 1, wherein determining an effective motion frequency for the portable device comprises processing the motion sensor data by performing a frequency domain analysis.

11. The method of claim 10, wherein the frequency domain analysis comprises a Fast Fourier Transform (FFT).

12. The method of claim 1, wherein reconstructing motion sensor data is based at least in part on the determined effective motion frequency.

13. The method of claim 12, further comprising determining a maximum amplitude frequency component corresponding to the effective motion frequency.

14. The method of claim 13, further comprising determining coefficients at the maximum amplitude frequency component and applying the determined coefficients to reconstruct the motion sensor data.

15. The method of claim 1, wherein calculating the heading misalignment angle is based at least in part on processing the motion sensor data from the portable device.

16. The method of claim 15, wherein processing the motion sensor data comprises using a maximum variance technique.

17. The method of claim 16, wherein processing the motion sensor data comprises determining a slope of an axis having maximum variance.

18. The method of claim 16, wherein processing the motion sensor data comprises using Principal Component Analysis (PCA).

19. The method of claim 15, wherein processing the motion sensor data comprises determining an axis representing a minimum sum of squared distances.

20. The method of claim 19, further comprising determining the axis representing a minimum sum of squared distances using a binary search.

21. The method of claim 19, further comprising determining the axis representing a minimum sum of squared distances using an analytical technique.

22. The method of claim 15, further comprising processing the motion sensor data to resolve an ambiguity in the calculated heading misalignment angle.

23. The method of claim 22, wherein resolving the calculated heading misalignment angle ambiguity comprises performing a statistical analysis of at least one of: (i) roll and pitch angle averages; and (ii) average and range of vertical gyroscope data.

24. The method of claim 1, wherein detecting steps taken by the user comprises estimating a time interval between steps based at least in part on the determined effective motion frequency.

25. The method of claim 24, further comprising registering a step taken by comparing a time associated with a previously detected step to the estimated time interval.

26. The method of claim 1, wherein performing dead reckoning for the cart further comprises processing the motion sensor data to determine a heading of the portable device.

27. The method of claim 26, wherein performing dead reckoning for the cart further comprises estimating cart heading based at least in part on the calculated heading misalignment angle and the determined heading of the portable device.

28. The method of claim 1, wherein providing a navigation solution for the cart comprises a position of the cart determined at least in part by the dead reckoning.

29. The method of claim 28, wherein providing a navigation solution for the cart comprises using the determined position of the cart as an update in the update phase of a state estimation technique.

30. The method of claim 28, wherein providing a navigation solution for the cart further comprises integrating a source of absolute navigational information.

31. The method of claim 30, wherein the source of absolute navigational information is at least one of: (i) a global navigation satellite system (GNSS); (ii) cell-based positioning; (iii) WiFi-based positioning; (iv) Bluetooth-based positioning; (iv) other wireless-based positioning; (v) magnetic fingerprint positioning; or (vi) visual light communication (VLC)-based positioning.

32. The method of claim 30, wherein the source of absolute navigational information is an anchor point.

33. A portable device for cart navigation, wherein the portable device is conveyed by a cart and may be tethered or untethered, wherein mobility of the portable device may be constrained or unconstrained within the cart, and wherein the cart is an apparatus propelled by on foot motion of a user, comprising:
  a sensor assembly integrated with the portable device, including at least one sensor configured to output data representing motion of the portable device;
  a processor operable to obtain the motion sensor data: i) when the portable device is tethered to the cart and when the portable device is untethered to the cart; and ii) when mobility of the device is constrained within the cart and when mobility of the device is unconstrained within the cart; and
  a navigation module implemented with the processor configured to:
    a) determine the portable device is in a cart motion mode;
    b) determine the cart is moving;
    c) determine an effective motion frequency for the portable device;
    d) reconstruct motion sensor data;
    e) calculate heading misalignment angle;
    f) detect steps taken by the user;
    g) perform dead reckoning for the cart based at least in part on the calculated heading misalignment angle and the detected steps; and
    h) provide a navigation solution for the cart based at least in part on the dead reckoning.

34. The portable device of claim 33, comprising a source of absolute navigational information, wherein the processor is configured to obtain the absolute navigational information and the navigation module is configured to integrate the absolute navigational information when providing the navigation solution for the cart.

35. The portable device of claim 34, wherein the source of absolute navigational information is at least one of the following: (i) a global navigation satellite system (GNSS); (ii) cell-based positioning; (iii) WiFi-based positioning; (iv) Bluetooth-based positioning; (v) Bluetooth low energy-based positioning; (vi) other wireless-based positioning; and (vii) visual light communication-based positioning.

36. The portable device of claim 33, wherein the sensor assembly comprises an inertial sensor.

37. The device of claim 36, wherein the inertial sensor is implemented as a Micro Electro Mechanical System (MEMS).

38. The portable device of claim 33, wherein the sensor assembly includes an accelerometer and a gyroscope.

* * * * *